US012649689B2

(12) United States Patent
Purola et al.

(10) Patent No.: US 12,649,689 B2
(45) Date of Patent: Jun. 9, 2026

(54) METHOD AND APPARATUS FOR HEATING FLUIDS IN PROCESSES RELATED TO REFINING AND PETROCHEMICAL INDUSTRIES USING ROTARY GENERATED THERMAL ENERGY

(71) Applicant: Coolbrook Oy, Helsinki (FI)

(72) Inventors: Veli Matti Purola, Helsinki (FI); Tuomas Ouni, Helsinki (FI)

(73) Assignee: COOLBROOK OY, Helsinki (FI)

( * ) Notice: Subject to any disclaimer, the term of this patent is extended or adjusted under 35 U.S.C. 154(b) by 515 days.

(21) Appl. No.: 18/046,333

(22) Filed: Oct. 13, 2022

(65) Prior Publication Data

US 2023/0115774 A1     Apr. 13, 2023

Related U.S. Application Data

(60) Provisional application No. 63/255,433, filed on Oct. 13, 2021.

(51) Int. Cl.

| | |
|---|---|
| *C10G 31/06* | (2006.01) |
| *B28B 11/24* | (2006.01) |
| *C01B 3/24* | (2006.01) |
| *C01B 32/16* | (2017.01) |
| *C03B 5/235* | (2006.01) |
| *C03B 37/022* | (2006.01) |
| *C03C 1/00* | (2006.01) |
| *C04B 7/36* | (2006.01) |
| *C04B 7/42* | (2006.01) |
| *C04B 7/43* | (2006.01) |

(Continued)

(52) U.S. Cl.
CPC ............ *C04B 7/432* (2013.01); *B28B 11/243* (2013.01); *C01B 3/24* (2013.01); *C01B 32/16* (2017.08); *C03B 5/235* (2013.01); *C03B 37/022* (2013.01); *C03C 1/004* (2013.01); *C04B 7/367* (2013.01); *C04B 7/42* (2013.01); *C04B 7/475* (2013.01); *C04B 33/24* (2013.01); *C04B 33/32* (2013.01); *C10G 9/40* (2013.01); *C10G 11/20* (2013.01); *C10G 47/32* (2013.01); *C10G 47/36* (2013.01); *C21B 13/085* (2013.01); *D01F 9/22* (2013.01); *F22B 3/06* (2013.01); *F23G 7/061* (2013.01); *F24H 1/0018* (2013.01); *F24V 30/00* (2018.05); *F24V 40/00* (2018.05); *F27B 7/2016* (2013.01); *F27B 7/34* (2013.01); *F27B 9/10* (2013.01); *F28D 20/0056* (2013.01); *C01B 2203/0205* (2013.01); *C01B 2203/0833* (2013.01); *C01B 2203/1241* (2013.01); *C04B 2290/20* (2013.01); *C10G 2300/1033* (2013.01); *C10G 2300/4081* (2013.01); *C10G 2300/807* (2013.01); *F23G 2204/00* (2013.01); *F23G 2209/14* (2013.01); *F28D 2020/0013*

(2013.01); *F28D 2020/0026* (2013.01); *F28D 2020/0047* (2013.01); *F28D 2020/006* (2013.01); *F28D 2020/0078* (2013.01)

(58) Field of Classification Search
CPC ................................ C10G 31/06; C10G 31/10
See application file for complete search history.

(56) References Cited

U.S. PATENT DOCUMENTS

| | | | |
|---|---|---|---|
| 4,614,229 A | 9/1986 | Oldweiler | |
| 6,484,502 B1 * | 11/2002 | Kikuchi | .................... F03D 9/25 |
| | | | 60/648 |

(Continued)

FOREIGN PATENT DOCUMENTS

| | | |
|---|---|---|
| EP | 1063273 A1 | 12/2000 |
| EP | 3249027 A1 | 11/2017 |

(Continued)

OTHER PUBLICATIONS

International Search Report and Written Opinion, PCT/FI2022/050682, mailed Jan. 16, 2023 (14 pp.).

(Continued)

*Primary Examiner* — Randy Boyer
(74) *Attorney, Agent, or Firm* — Eversheds Sutherland (US) LLP

(57)     ABSTRACT

A method is provided for inputting thermal energy into fluidic medium in a process or processes related to oil refining and/or petrochemical industries by at least one rotary apparatus comprising a casing with at least one inlet and at least one exit, a rotor comprising at least one row of rotor blades arranged over a circumference of a rotor hub mounted onto a rotor shaft, and a stator configured as an assembly of stationary vanes arranged at least upstream of the at least one row of rotor blades. In the method, an amount of thermal energy is imparted to a stream of fluidic medium directed along a flow path formed inside the casing between the inlet and the exit by virtue of a series of energy transformations occurring when said stream of fluidic medium passes through stationary and rotating components of said rotary apparatus, respectively. The method further comprises: integration of said at least one rotary apparatus into a heat-consuming process facility configured as a refining and/or petrochemical facility and further configured to carry out heat-consuming process or processes related to refining of oil and/or producing petrochemicals at temperatures essentially equal to or exceeding 500 degrees Celsius (° C.), and conducting an amount of input energy into the at least one rotary apparatus integrated into the heat-consuming process facility, the input energy comprises electrical energy. A rotary apparatus and related uses are further provided.

31 Claims, 12 Drawing Sheets

(51) Int. Cl.

| | | |
|---|---|---|
| *C04B 7/47* | (2006.01) |
| *C04B 33/24* | (2006.01) |
| *C04B 33/32* | (2006.01) |
| *C10G 9/40* | (2006.01) |
| *C10G 11/20* | (2006.01) |
| *C10G 31/10* | (2006.01) |
| *C10G 47/32* | (2006.01) |
| *C10G 47/36* | (2006.01) |
| *C21B 13/08* | (2006.01) |
| *D01F 9/22* | (2006.01) |
| *F22B 3/06* | (2006.01) |
| *F23G 7/06* | (2006.01) |
| *F24H 1/00* | (2022.01) |
| *F24V 30/00* | (2018.01) |
| *F24V 40/00* | (2018.01) |
| *F27B 7/20* | (2006.01) |
| *F27B 7/34* | (2006.01) |
| *F27B 9/10* | (2006.01) |
| *F28D 20/00* | (2006.01) |

(56) References Cited

U.S. PATENT DOCUMENTS

| | | | |
|---|---|---|---|
| 7,232,937 B2 * | 6/2007 | Bushuev | C10G 9/04 |
| | | | 585/648 |
| 2006/0116543 A1 | 6/2006 | Bellet et al. | |

| | | | |
|---|---|---|---|
| 2007/0007175 A1 | 1/2007 | Strack et al. | |
| 2008/0128326 A1 | 6/2008 | McCoy et al. | |
| 2012/0024749 A1 | 2/2012 | Strack et al. | |
| 2014/0243569 A1* | 8/2014 | Seppala | B01J 3/08 |
| | | | 585/653 |
| 2019/0264613 A1* | 8/2019 | Caratelli | F02C 7/18 |
| 2019/0284485 A1 | 9/2019 | Willigenburg | |
| 2020/0114332 A1 | 4/2020 | Xu | |
| 2020/0290939 A1 | 9/2020 | Willigenburg | |
| 2021/0171836 A1* | 6/2021 | Purola | C10G 9/24 |
| 2022/0127209 A1* | 4/2022 | Ward | H02J 15/006 |

FOREIGN PATENT DOCUMENTS

| | | | | |
|---|---|---|---|---|
| EP | 3415587 A1 | 12/2018 | | |
| EP | 3725865 A1 | 10/2020 | | |
| JP | S58-213087 A | 12/1983 | | |
| JP | 2003504485 A | 2/2003 | | |
| JP | 2021127729 A * | 9/2021 | | F04D 17/122 |
| WO | 2017125833 A1 | 7/2017 | | |

OTHER PUBLICATIONS

Extended European Search Report, EP 22880466.2, dated Jul. 30, 2025 (11 pp.).

* cited by examiner

100

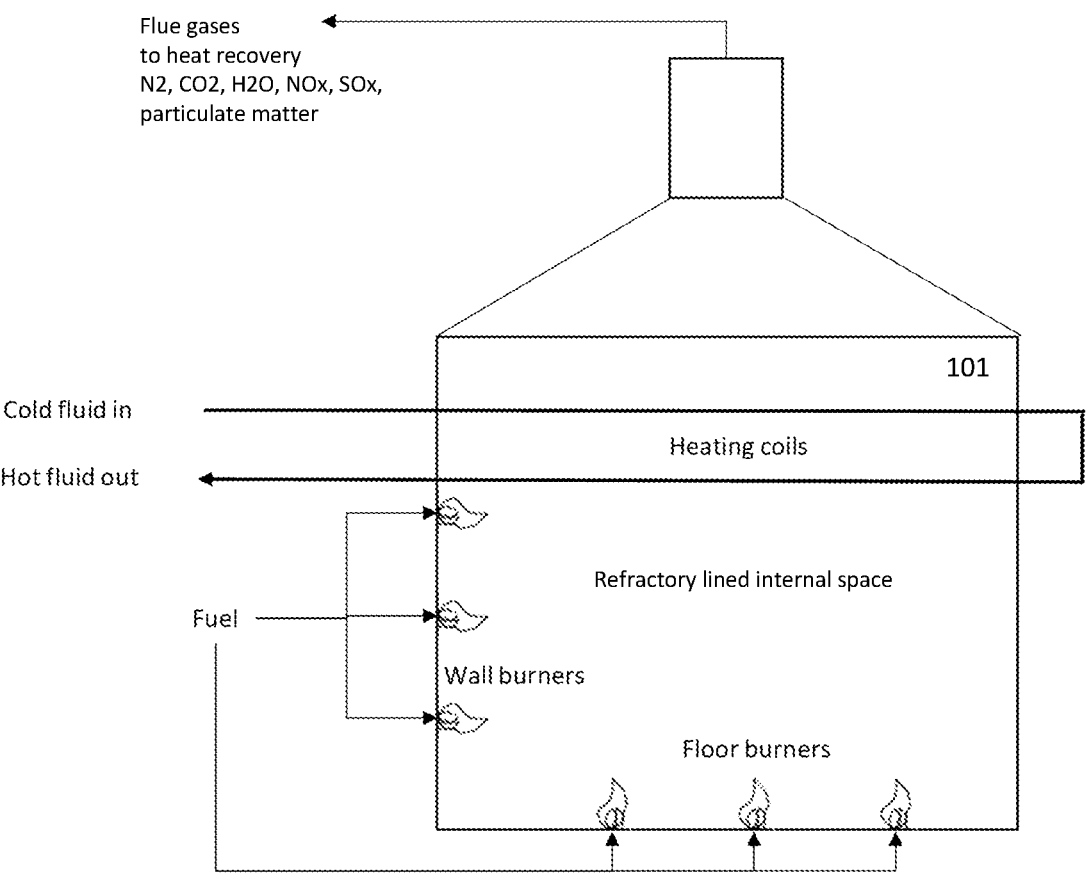
Figure 4A – PRIOR ART

METHOD AND APPARATUS FOR HEATING FLUIDS IN PROCESSES RELATED TO REFINING AND PETROCHEMICAL INDUSTRIES USING ROTARY GENERATED THERMAL ENERGY

CROSS-REFERENCE TO RELATED APPLICATION

This application claims priority to U.S. Provisional Patent Application No. 63/255,433, filed Oct. 13, 2021, which is incorporated herein by reference.

FIELD OF THE INVENTION

The present invention generally relates to systems and methods for inputting thermal energy (heat) into fluids. In particular, the invention relates to tools and processes for optimizing energy efficiency and reducing greenhouse gas and particle emissions in heat-consuming industrial processes related to oil refining and/or petrochemical industries carried out at high and extremely high temperatures.

BACKGROUND

Industry and governments have been combating to find technologies to achieve significant reductions in greenhouse gas (GHG) emissions. Refining and petrochemicals operations that transform crude oil and natural gas into target products or intermediates traditionally represent emission-intensive industries and hence bear a key role to reach low emission targets set by companies, governments and international organizations.

Fired heaters often referred to as furnaces are widely used in oil and petrochemical refining for heating gases and liquids and for evaporating liquid streams. Fired heaters are typically used for high heat duty- and high temperature processes. One example of such heaters are direct-fired process heaters (furnaces) utilized for heating and vaporizing crude oil atmospheric- and vacuum distillation feedstocks (400-450° C.). Typical refinery and/or petrochemical operations that utilize fired heaters include but are not limited to the processes of gas regeneration, lube oil production, delayed coking, catalytic reforming, pyrolysis of hydrocarbon feedstocks for olefin production (steam cracking), as well as generation and/or superheating of associated fluids, such as steam.

Conventional fired heater or furnace 101 is illustrated on FIG. 4A. Conventional fired heater typically has a refractory-lined space with a number of burners placed on the walls or floor of the space, in order to optimise temperatures in various parts of the space depending on a heating application. Natural gas or other fuel is fed to the burners, where it is burnt with air provided from an air blower. Incinerated fuel heats surfaces of tubes (referred to as heating coils) installed in a radiant section of the furnace (a firebox), and fluid flowing inside the tubes is thus heated through a (radiant) heat transfer. Most furnace designs also include a convection section placed above the firebox (not shown), where additional heat transfer takes place by convection. Flue gases resulting from incineration of the fuel exit the furnace through a flue gas stack typically positioned on the top of the furnace. A complex heat recovery system is often required to recover heat stored in hot flue gases, and often heat recovery is limited by a condensation temperature of water due to the presence of acidic compounds like carbon dioxide ($CO_2$) that would decrease the pH of the water and cause material corrosion issues. Flue gases vented into the atmosphere are rich in $CO_2$ and also contain other environmentally harmful compounds, such as nitrogen oxides, sulphur oxides and particulate matter.

Similar furnace designs have been historically adopted for the olefin cracking technology. In traditional cracking furnaces, convection section is a portion of a furnace where hydrocarbon feed undergoes preheating, mixing with dilution steam and other operations, which prepare the feed for cracking (pyrolysis). The latter occurs in a downstream radiant section typically represented by a stack of reactor tubes (coils). Heat required for the convection section is largely recovered from flue gases exhausted during pyrolysis. Although tubular, fuel-fired reactors often referred to as olefin cracking furnaces have undergone significant developments since early 1950's, these furnaces still suffer from high energy demand, poor thermal efficiency (high fuel gas consumption), and product yield limitations. All these reasons have promoted the plant owners to search for solutions that exploit renewable energy-based technologies.

Electrification has been generally considered a solution to reduce emissions; however, one of the obstacles for bringing electrification into use in a majority of industrial processes is incapacity of electrified heaters to achieve high temperatures required by these processes. By way of example, core processes to crack hydrocarbons into bulk chemicals require very high temperatures, such as within a range of about 850 to 1600 degrees Celsius (° C.). This sets strict requirements for energy sources and utilized technologies. Although considered a suitable solution to reduce GHG emissions, electrification of industrial processes remains hindered due to inability of current technologies and existing facility infrastructures to fulfil the needs in achieving sufficiently high temperatures.

A number of rotary solutions have been proposed for heating purposes. Thus, U.S. Pat. No. 11,098,725 B2 (Sanger et al) discloses a hydrodynamic heater pump device operable to selectively generate a stream of heated fluid and/or pressurized fluid. Mentioned hydrodynamic heater pump is designed to be incorporated in an automotive vehicle cooling system to provide heat for warming a passenger compartment of the vehicle and to provide other capabilities, such as window deicing and engine cooling. The disclosed device may also provide a stream of pressurized fluid for cooling an engine. Disclosed technology is based on friction; and, since the fluid to be heated is liquid, the presented design is not suitable for conditions involving extreme turbulence of gas aerodynamics.

U.S. Pat. No. 7,614,367 B1 (Frick) discloses a system and method for flamelessly heating, concentrating or evaporating a fluid by converting rotary kinetic energy into heat. Configured for fluid heating, the system may comprise a rotary kinetic energy generator, a rotary heating device and a primary heat exchanger all in closed-loop fluid communication. The rotary heating device may be a water brake dynamometer. The document discloses the use of the system for heating water in offshore drilling or production platforms. However, the presented system is not suitable for heating gaseous media, neither is it feasible for use with high- and extremely high temperatures (due to liquid stability, vapor pressure, etc.).

Additionally, some rotary turbomachine-type devices are known to implement the processes of hydrocarbon (steam) cracking and aim at maximizing the yields of the target products, such as ethylene and propylene.

In this regard, an update in the field of technology related to design and manufacturing of efficient heating systems, in particular those suitable for use in refining of oil and in petrochemical applications at high- and extremely high temperatures, is still desired, in view of addressing challenges associated with raising temperatures of fluidic substances in efficient and environmentally friendly manner.

SUMMARY OF THE INVENTION

An objective of the present invention is to solve or to at least mitigate at least some of the problems arising from the limitations and disadvantages of the related art. One or more objectives are achieved by various embodiments of the methods for generation of a heated fluidic medium described herein, the rotary apparatuses and related uses as defined herein.

In an aspect, a method is provided for inputting thermal energy into a process or processes related to oil refining and/or petrochemical industries in a refining and/or petrochemical facility.

In embodiment, the method comprises generation of a heated fluidic medium by at least one rotary apparatus integrated into the refining and/or petrochemical facility, the at least one rotary apparatus comprising a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades the method further comprises: integrating the at least one rotary apparatus into the refining and/or petrochemical facility configured to carry out heat-consuming process or processes related to refining of oil and/or producing petrochemicals at temperatures essentially equal to or exceeding about 500 degrees Celsius (° C.), conducting an amount of input energy into the at least one rotary apparatus integrated into the refining and/or petrochemical facility, the input energy comprises electrical energy, and operating the at least one rotary apparatus integrated into the refining and/or petrochemical facility such, that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated.

In embodiment, the method comprises connecting, in said refining and/or petrochemical facility, the at least one rotary apparatus to at least one heat-consuming unit configured as a reactor or furnace and adapted to carry out heat-consuming process or processes related to refining of oil and/or producing petrochemicals in the refining and/or petrochemical facility. In embodiments, the heat-consuming unit is further configured as any one of: a heater, a burner, an incinerator, a boiler, a dryer, a conveyor device, or a combination thereof.

In embodiment, the method comprises generation, by at least one rotary apparatus, of the fluidic medium heated to the temperature essentially equal to or exceeding about 500 degrees Celsius (° C.), or to the temperature essentially equal to or exceeding about 1200° C., or to the temperature essentially equal to or exceeding about 1700° C.

In embodiment, the method comprises adjusting velocity and/or pressure of the stream of fluidic medium propagating through the rotary apparatus, to produce conditions, at which the stream of the heated fluidic medium is generated.

In embodiments, in said method, the heated fluidic medium is generated by at least one rotary apparatus comprising two or more rows of rotor blades sequentially arranged along the rotor shaft.

In an embodiment, in said method, the heated fluidic medium is generated by at least one rotary apparatus further comprising a diffuser area arranged downstream of the at least one row of rotor blades, the method furthers comprises operating the at least one rotary apparatus integrated into the refining and/or petrochemical facility such, that an amount of thermal energy is imparted to a stream of fluidic medium directed along a flow path formed inside the casing between the inlet and the exit by virtue of a series of energy transformations occurring when said stream of fluidic medium successively passes through the stationary guide vanes, the at least one row of rotor blades and the diffuser area, respectively, whereby a stream of heated fluidic medium is generated. The diffuser area may be configured with or without stationary vanes.

In embodiments, in said method, the amount of thermal energy added to the stream of fluidic medium propagating through the rotary apparatus is controlled by adjusting the amount of input energy conducted into the at least one rotary apparatus integrated into the heat-consuming process facility.

In embodiment, the method further comprises arranging an additional heating apparatus downstream the at least one rotary apparatus and introducing a reactive compound or a mixture of reactive compounds to the stream of fluidic medium propagating through said additional heating apparatus, whereupon the amount of thermal energy is added to said stream of fluidic medium through exothermic reaction (s). In embodiment, the reactive compound or a mixture of reactive compounds is introduced to the stream of fluidic medium preheated to a predetermined temperature. In embodiment, the reactive compound or a mixture of compounds is introduced to the stream of fluidic medium preheated to a temperature essentially equal to or exceeding about 1700° C. In embodiment, preheating of the stream of fluidic medium to the predetermined temperature is implemented in the rotary apparatus.

In embodiment, the method comprises integrating at least two rotary apparatuses into the refining and/or petrochemical facility, said rotary apparatuses being connected in parallel or in series. In embodiment, the method comprises generation of the heated fluidic medium by at least two sequentially connected rotary apparatuses, wherein the stream of fluidic medium is preheated to a predetermined temperature in at least a first rotary apparatus in a sequence, and wherein said stream of fluidic medium is further heated in at least a second rotary apparatus in the sequence by inputting an additional amount of thermal energy into the stream of preheated fluidic medium propagating through said second rotary apparatus. In embodiment, in said method, in at least the first rotary apparatus in the sequence, the stream of fluidic medium is preheated to a temperature essentially equal to or exceeding about 1700° C. In embodiment, in said method, the additional amount of thermal energy is added to the stream of fluidic medium propagating through said at least second rotary apparatus in the sequence by virtue of introducing the reactive compound or a mixture of reactive compounds into said stream.

In embodiment, the method comprises introducing the reactive compound or a mixture of compounds into the heat-consuming process or processes related to refining of oil and/or producing petrochemicals.

In embodiment, in said method, the heated fluidic medium generated by the at least one rotary apparatus is selected from the group consisting of a feed gas, a recycle gas, a make-up gas, and a process fluid.

In embodiment, in said method, the fluidic medium that enters the rotary apparatus is an essentially gaseous medium.

In embodiments, the method comprises generation of the heated fluidic medium in the rotary apparatus. In embodiments, the heated fluidic medium generated in the rotary apparatus is a hydrocarbon-containing gas. In embodiments, the heated fluidic medium generated in the rotary apparatus is a gaseous medium other than the hydrocarbon-containing gas, such as for example air, steam ($H_2O$), nitrogen ($N_2$), hydrogen ($H_2$), carbon dioxide ($CO_2$), carbon monoxide (CO), ammonia ($NH_3$), or any combination thereof. In embodiments, the heated fluidic medium generated in the rotary apparatus is a recycle gas recycled from exhaust gases generated during processes related to oil refining and/or petrochemical industries in a refining and/or petrochemical facility. In embodiments, the method further comprises generation of the heated fluidic medium outside the rotary apparatus through a process of heat transfer between the heated fluidic medium generated in the rotary apparatus and a stream of fluidic medium bypassing the rotary apparatus.

In embodiment, the method further comprises increasing pressure in the stream of fluidic medium propagating through the rotary apparatus.

In embodiment, in said method, the amount of electrical energy conducted as the input energy into the at least one rotary apparatus integrated in the heat-consuming process facility is within a range of about 5 percent to 100 percent.

In embodiment, in said method, the amount of electrical energy conducted as the input energy into the at least one rotary apparatus integrated in the heat-consuming process facility is obtainable from a source of renewable energy or a combination of different sources of energy, optionally, renewable energy.

In embodiment, in said method, the at least one rotary apparatus is utilized to balance variations, such as oversupply and shortage, in the amount of electrical energy (obtained through supply and/or production, for example), optionally renewable electrical energy, by virtue of being integrated into the refining and/or petrochemical together with an at least one non-electrical energy operable heater device.

According to an embodiment, the method for inputting thermal energy into a process or processes related to oil refining and/or petrochemical industries, which comprises generation of a heated fluidic medium by at least one rotary apparatus integrated into a refining and/or petrochemical facility, improves energy efficiency or reduces greenhouse gas and particle emissions, or both.

In another aspect, a refining and/or petrochemical facility is provided, in accordance with the present disclosure.

In an embodiment, the refining and/or petrochemical facility comprises at least one reactor or furnace configured to perform a process or processes related to oil refining and/or petrochemical industries at temperatures essentially equal to or exceeding about 500 degrees Celsius (° C.) and at least one rotary apparatus configured to generate a heated fluidic medium for inputting thermal energy into said at least one reactor or furnace, the at least one rotary apparatus comprising: a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, wherein said at least one rotary apparatus is configured to receive an amount of input energy, the input energy comprising electrical energy, and wherein the at least one rotary apparatus is further configured to operate such that an amount of thermal energy is imparted to a stream of fluidic medium directed along a flow path formed inside the casing between the inlet and the exit by virtue of a series of energy transformations occurring when said stream of fluidic medium passes through the stationary guide vanes and the at least one row of the rotor blades, respectively, whereby a stream of heated fluidic medium is generated.

In some configurations, within said refining and/or petrochemical facility, the at least one rotary apparatus is further configured to supply heated fluidic medium into least one heat-consuming unit configured as any one of: a heater, a burner, an oven, an incinerator, a dryer, a boiler, a conveyor device, or a combination thereof, and the at least one rotary apparatus is connected to any one of these heat-consuming units or any combination thereof within the refining and/or petrochemical facility.

In embodiments, in said refining and/or petrochemical facility, the at least one rotary apparatus comprises two or more rows of rotor blades sequentially arranged along the rotor shaft. In an embodiment, stationary vanes arranged into the assembly upstream of the at least one row of rotor blades are configured as stationary guide vanes. In an embodiment, the at least one rotary apparatus further comprises a diffuser area arranged downstream of the at least one row of rotor blades. The diffuser area may be configured with or without stationary diffuser vanes. In some configurations, vaned diffuser may be implemented as a plurality of stationary vanes arranged into an assembly downstream of the at least one row of rotor blades.

In an embodiment, the at least one rotary apparatus provided within said refining and/or petrochemical facility is further configured to increase pressure in the fluidic stream propagating therethrough.

In some configurations, the at least one rotary apparatus provided within said refining and/or petrochemical facility is configured to implement a fluidic flow, between the inlet and the exit, along a flow path established in accordance with any one of: an essentially helical trajectory formed within an essentially toroidal-shaped casing; an essentially helical trajectory formed within an essentially tubular casing, an essentially radial trajectory, and along the flow path established by virtue of the stream of fluidic medium in the form of two spirals rolled up into vortex rings of right and left directions.

In embodiments, the refining and petrochemical facility is configured for thermal or thermochemical pyrolysis of hydrocarbons, optionally, through a process of steam cracking.

In a further aspect, an assembly is provided and comprises at least two rotary apparatuses according to some previous aspect, said rotary apparatuses being connected in parallel or in series.

In a further aspect, an arrangement is provided and comprises at least one rotary apparatus according to some previous aspect, said at least one rotary apparatus being connected to at least one reactor or furnace.

In a further aspect, a refining and petrochemical facility is provided and is configured to implement a process or processes related to oil refining and/or production of petrochemicals through a method according to some previously defined aspects and embodiments; and it comprises at least one rotary apparatus as defined herein.

In an aspect, a method for oil refining and/or production of petrochemicals is provided, the method comprising generation of a heated fluidic medium by at least one rotary apparatus integrated into a refining and petrochemical facility, the at least one rotary apparatus comprising: a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, wherein an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated, the method further comprising: conducting an amount of input energy into the at least one rotary apparatus integrated into the refining and/or petrochemical facility, the input energy comprising electrical energy, supplying the stream of heated fluidic medium generated by the at least one rotary apparatus into the refining and petrochemical facility, and operating said at least one rotary apparatus and said refining and petrochemical facility to carry out a process or processes related to related to oil refining and/or production of petrochemicals at temperatures essentially equal to or exceeding about 500 degrees Celsius (° C.).

The utility of the present invention arises from a variety of reasons depending on each particular embodiment thereof.

Overall, embodiments of the invention offer an electrified rotary fluid heater to generate high temperature fluids, such as gases or liquids, which can be further used in a variety of heat-consuming processes related to refining of crude oil and/or manufacturing of petrochemical products. By way of example, a process of production of olefins, which are amongst of the most common petrochemical products, through steam cracking typically employs fuel-fired heaters to heat fluids to the temperatures needed for pyrolytic conversion of hydrocarbon feed to target compounds. The invention presented herewith enables replacing conventional fuel fired-heaters, by rotary apparatus(-es). The presented method further enables inputting thermal energy the heat-consuming utilities such as reactors and/or furnaces adapted to accommodate the reactions related to petrochemical production and/or oil refining and operating at high- and extremely high temperatures, such as temperatures generally exceeding 500° C. These reactors and/or furnaces have high demand for thermal energy and hence for heat consumption. The invention offers apparatuses and methods for heating fluidic substances to the temperatures within a range of about 500° C. to about 2000° C., i.e. the temperatures used in refining and petrochemical industries.

In the method, the advantages accompanied by replacing fired heaters with the rotary apparatus include at least:

Support for electrified heating;

Elimination or at least significant reduction of greenhouse gas (such as NO, $CO_2$, CO, $NO_x$), other harmful components (such as for example HCl, $H_2S$, $SO_2$, and heavy metals) originating from fuels, particle emissions and soot emissions;

Reduced volume of a heater: the volume of the rotary apparatus is at least one order of magnitude smaller as compared to the volume of conventional processed heaters or heat exchangers;

Decreased investment costs;

Improved safety in case of using flammable, hazardous fluids/gases;

Feasibility in handling large volumes of gases;

Absence of pressure drop;

Possibility of using the rotary (heater) apparatus also for compression of gases (a blower functionality);

Being not dependent on temperature difference in direct heating of gases (as compared to conventional heater/furnace). Temperature rise in the rotary apparatus can be in range of about 10 to 1700° C. or more;

Possibility for using the rotary apparatus in indirect heating of fluids optionally by optimizing temperature difference in heat exchanger(s);

Possibility for at least partial recycling of hot process gases, thus improving and making simpler the heat recovery and improving energy efficiency;

Possibility for further raising the temperature of gases to be heated by adding reactive chemicals which further increase the gas temperature up to e.g. 2000° C. or higher by exothermic reactions.

In embodiments, the rotary apparatus can be used to replace conventional fired heaters or process furnaces for direct or indirect heating in a variety of processes and applications related to refining and petrochemical industries. Traditionally such heat has been mainly produced through burning of fossil fuels leading to significant $CO_2$ emissions. Replacing fossil fuels with wood or other bio-based materials has severe resource limitations and other significant environmental implications such as the ones associated with sustainable land use. With increased cost-efficiency of renewable electricity, such as for example with rapid development of wind- and solar power, it is possible to replace fossil fuel firing with the rotary apparatus powered with renewable electricity, which in turn would significantly reduce greenhouse gas emissions. The rotary apparatus allows electrified heating of fluids to the temperatures up to 1700° C. and higher. Such temperatures are difficult or impossible to reach with current electrical heating applications.

The invention thus enables reduction of greenhouse gas- (CO, $CO_2$, $NO_x$) and particle emissions. By using the rotary apparatus, it is also possible to create closed or semi-closed heating loops for refining and petrochemical processes, and to further improve energy efficiency of these processes by reducing heat losses through recycling flue gases. On the contrary, in conventional heaters, flue gases can be recycled only partly. Building fully electrified and emission-free petrochemical plant solutions can be enabled.

The rotary apparatus can be used for direct heating of process gases, inert gases, air or any other gases or for indirect heating of process fluids (liquid, vapor, gas, vapor/liquid mixtures etc.). For example, the rotary apparatus can be used for direct heating of a recycle gas recycled from exhaust gases generated during the steam cracking process involved in olefin production.

Heated fluid generated in said rotary apparatus can be further used for heating any one of gases, vapor, liquid, and solid materials. Hence, hot gases generated in the rotary apparatus can be used for heating solid materials or they can be used for heating the feed in a packed reactor adapted for any one of catalytic and thermal processes. The method offered herewith further allows for using hot gases as heating media in heat exchangers in order to indirectly heat process gases or liquids. Additional uses, such as in evaporators, are not excluded.

The rotary apparatus can at least partly replace- or it can be combined with (e.g. as pre-heater) multiple types of furnaces, heaters, gasifiers, and reactors that are traditionally fired or heated with solid, liquid or gaseous fossil fuels or in some cases bio-based fuels, including reactors and furnaces used in manufacturing of major petrochemical products, such as olefins, aromatics and synthesis gas, for example. Such appliances may include but are not limited to: furnaces, ovens, heaters, burners, incinerators, boilers, dryers, conveyor devices, reactors, and their combinations. Some particular examples include, but are not limited to: heating furnace, regenerative furnaces, vacuum towers, steam boilers, catalytic reactors, fluidized bed reactors, and the like. Heated gases can be flammable, reactive, or inert and can be recycled back to the rotary apparatus. In addition to its heating function, the rotary apparatus may also act as a blower (combined heater-blower functionality), thus allowing to increase pressure and to recycle gas in various applications, such as for example in catalytic fluidized bed crackers utilized in oil refining industry.

In the method offered herewith, the rotary apparatus can be used in heating hydrocarbon-containing feed to required operating temperature in an almost complete absence of $CO_2$ emissions (the latter is possible when the rotary apparatus uses renewable electricity). Residence times in the rotary apparatus are extremely short, which improves selectivity and reduces formation of reaction by-products. Short residence times also minimize coke formation and extends operating periods between scheduled decoking procedures. In the method according to the present disclosure, a reactor for a heat-consuming process (such as a steam cracker, for example), and the rotary apparatus used as a heater are separated, which allows for additional flexibility in operation. According to the embodiments, the reactor or furnace used in refining of oil or petrochemicals can be connected to the rotary apparatus(-es) in parallel or in series, which further allows for switching between thermal reactors for carbon removal and catalytic reactors for decoking and cleaning in the same production process.

Additionally, the present solution enables improved optimization of the temperature difference(s) in the heat exchangers in indirect heating.

The invention further provides for flexibly using electrical energy, such as electrical energy obtainable from renewable sources. Production of renewable energy varies on daily basis and even on hourly basis. The invention allows for balancing renewable electricity production by integration of the rotary apparatus disclosed herewith with conventional fuel-operated (fuel-fired) heaters to provide heat to a variety of processes involved in refining of oil and manufacturing of petrochemicals.

The invention enables electrification of steam cracking processes in a labour- and cost-efficient manner.

The invention further enables a reduction in the on-site investment costs as compared to traditional fossil fired furnaces.

The expression "a number of" refers hereby to any positive integer starting from one (1), e.g. to one, two, or three. The expression "a plurality of" refers hereby to any positive integer starting from two (2), e.g. to two, three, or four. The terms "first" and "second", are used hereby to merely distinguish an element from another element without indicating any particular order or importance, unless explicitly stated otherwise.

The term "gasified" is utilized hereby to indicate matter being converted into a gaseous form by any possible means.

Different embodiments of the present invention will become apparent by consideration of the detailed description and accompanying drawings.

BRIEF DESCRIPTION OF THE DRAWINGS

FIG. 4A illustrates a conventional industrial heater or a furnace 101.

DETAILED DESCRIPTION OF THE EMBODIMENTS

Detailed embodiments of the present invention are disclosed herein with the reference to accompanying drawings.

Figure 1:
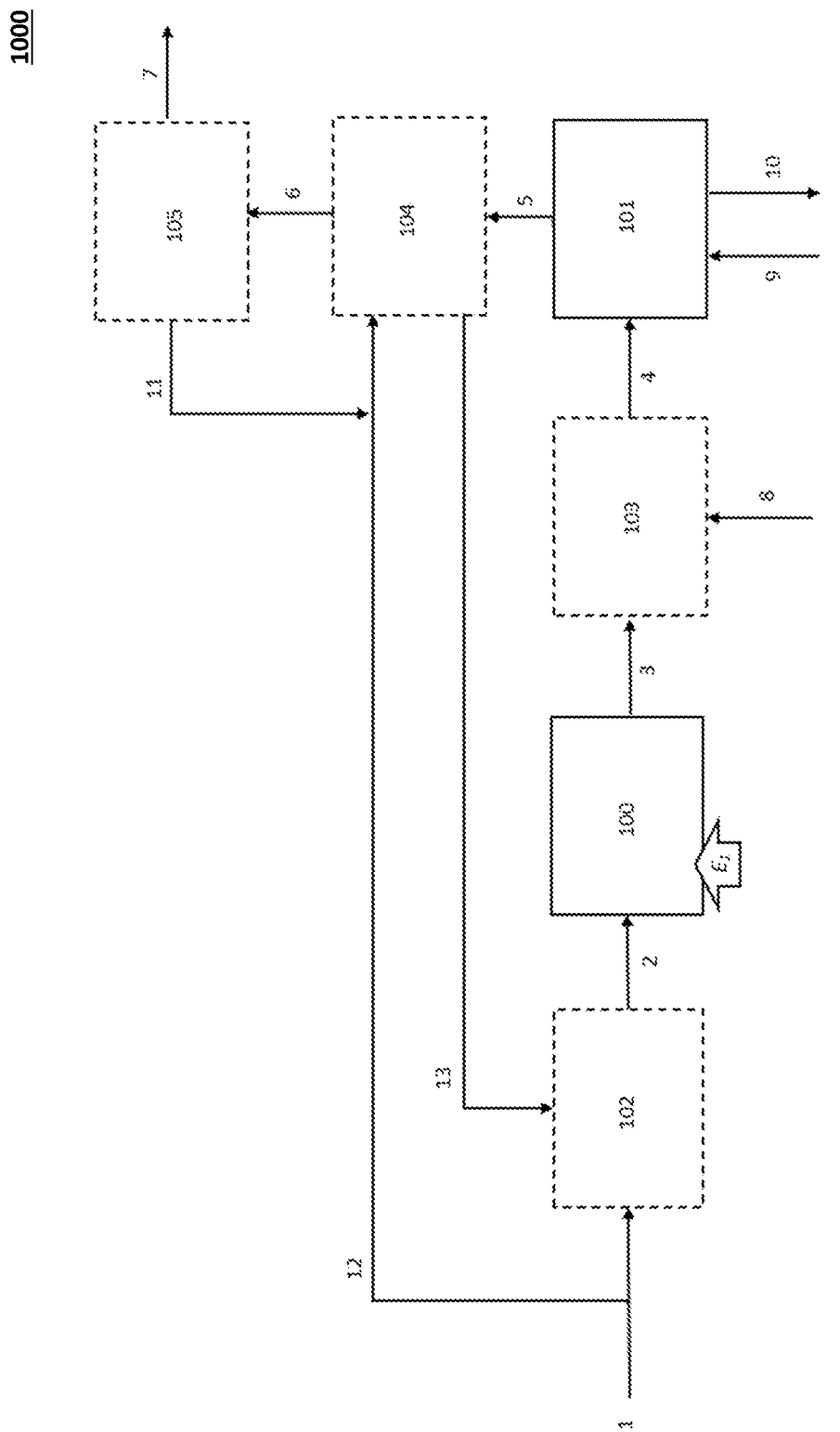
FIG. 1 is a block diagram representing, at 1000, a layout for an oil refining facility and/or a petrochemical production facility configured to implement a method according to the embodiments.

FIG. 1 is a block diagram representing, at 1000, a layout for a high temperature heat-consuming process facility configured to implement a method according to the embodiments. FIGS. 2A-E, FIGS. 3A-3C, and FIGS. 4B, 4C, 5A and 5B describe apparatuses and methods according to the embodiments. Presented Figures and related examples serve illustrative purposes and are not intended to limit applicability of the inventive concept to the layouts expressly presented in this disclosure. Block diagram sections shown by dotted lines may be optional in some configurations.

In embodiments, the heat-consuming facility 1000 is represented with an industrial plant, a factory, or any industrial system comprising equipment designed to perform an industrial process or a series of industrial processes aiming at producing goods from essentially raw materials or raw energy sources. In the present disclosure, the expression "producing goods" includes, but is not limited to manufacture, extraction and/or refinement with regard to a material (such as hydrocarbon-derived compounds, in the present context) and/or power. By way of example, not limitation, the facility 1000 can be configured as an oil/petroleum refinery of any existing design and hence accommodating a number of processes and related process units aiming at transforming raw hydrocarbons into various products, such as liquid petroleum gas (LPG), naphtha fractions, a variety of fuels and fuel oils. Refinery facility includes, for example crude and/or vacuum distillation units, separation units, arrangements for hydrotreating, gasification, and the like. In embodiments, the heat-consuming facility 1000 is configured to perform a process or processes aiming at refining crude oil and other feedstocks, such as bio-based feedstocks and recycles raw materials (e.g. recycled plastics, oils, etc.) and/or at manufacturing petrochemical products, such as for example olefins, aromatics and synthetic gas, from suitable feedstocks, such as for example naphthas, liquefied petroleum gas (LPG), or ethane. Petrochemical production relies on multi-stage processing of oil and associated petroleum gas. Hence, products obtained in oil refining (e.g. naphtha, LPG) can be further used in production of petrochemicals. The processes for converting crude oil to petrochemical products may thus be integrated into the same facility 1000. In additional or alternative embodiments, the facility 1000 can be further adapted to produce fuels. In present context, the term "fuel(s)" relates to products, including but not limited to including petroleum-derived hydrocarbons, used as energy carrier, and the term "petrochemical(s)" relates to any other product that is not used as a fuel.

Heat-consuming process(es) and related operational units configured to carry out heat-consuming processes related to refining of oil and/or to production of petrochemicals within the facility 1000 and referred to as heat-consuming process unit(s)/utility(ies) is/are collectively designated by a reference numeral 101. The facility 1000 may comprise a number of operational units 101 configured to perform same or different heat-consuming processes. In embodiments, the operational unit 101 comprises or consists of at least one heat-consuming device configured to carry out a heat-consuming process. In embodiments, the operational unit 101 is configured as a reactor device configured to carry out a reaction or a series of reactions aiming at production of predetermined organic hydrocarbon compounds, generally referred to as "petrochemicals" from suitable feedstocks, through thermal and/or catalytic processes. Petrochemical products ("petrochemicals") generally refer organic hydrocarbons derived from crude oil that are not used as fuels. Typical petrochemical products include olefins (e.g. ethylene, propylene, butenes) and aromatics (e.g. benzene, toluene, xylene, and mixtures thereof) that are used as basic intermediates in modern industrial chemistry.

The heat-consuming process facility 1000 is configured to carry out a heat-consuming industrial process or processes 101 at temperatures essentially equal to- or exceeding 500 degrees Celsius (° C.). In the present disclosure, the heat-consuming industrial process(es) is/are those involved in refining of petroleum/crude oil and in manufacturing of petrochemical and chemical products from hydrocarbon-containing feedstocks such as through the process of steam cracking. In embodiments, the facility 1000 is configured to carry out the heat-consuming industrial process(es) at temperatures essentially equal to- or exceeding 1200° C. In embodiments, the facility is configured to carry out the heat-consuming industrial process(es) at temperatures essentially equal to- or exceeding 1700° C. In some embodiments, the facility can be configured to carry out industrial process(es) at temperatures that exceed 1700° C., such as at 2000° C. or higher, such as within a range of about 1700° C. to about 2500° C. The facility can be configured to carry out industrial process(es) at about 1700° C., at about 1800° C., at about 1900° C., at about 2000° C., at about 2100° C., at about 2200° C., at about 2300° C., at about 2400° C., at about 2500° C., and at any temperature value falling in between the above-mentioned temperature points. It should be pointed out that the facility 1000 is not excluded from carrying out of at least a part of industrial processes at temperatures below 500° C.

Refinery operations and process stages involved in production of petrochemicals are typically associated with high thermal (heat) energy demand and consumption and, in conventional solutions, produce considerable industrial emissions such as carbon dioxide, other gases and aerosols into the atmosphere. The present disclosure offers methods and apparatuses for inputting thermal energy into refining and petrochemical industrial processes 101 with high heat energy demand, whereby energy efficiency in said processes can be markedly improved and/or the amount of air pollutants released into the atmosphere reduced. Layout 1000 (FIG. 1) schematically outlines these improved facility and method.

In embodiments, the method comprises generation of a heated fluidic medium by virtue of a rotary heater unit 100 comprising or consisting of at least one rotary apparatus, hereafter, the apparatus 100. For the sake of clarity, the rotary heater unit is designated in the present disclosure by the same reference number, 100, as the rotary apparatus. The rotary heater unit is preferably integrated into the process facility 1000. In an embodiment, the heated fluidic medium is produced by the at least one rotary apparatus; however, a plurality of rotary apparatuses may be used in series or in parallel.

The rotary apparatus 100 can be provided as a standalone apparatus or as a number of apparatuses arranged in series (in sequence) or in parallel. One or more apparatuses may be connected to a common heat-consuming unit 101. Connection may be direct or through a number of heat exchangers. In some configurations, a heat exchanger device or a number of heat exchanger devices may represent a heat-consuming unit/process 101.

The heat-consuming unit(s) 101 is/are provided as one or more reactors and/or furnaces adapted to implement reactions aiming at refining operations and manufacturing of petrochemical productions. Reactor devices may operate with and/or without catalyst to implement catalytic and/or thermal processes, respectively. The reactor can be for example a tubular coil reactor for steam cracking or any other appropriate type of a reactor device. In some configurations, thermal energy of the fluid, such as gas, heated in 100 is used directly to run endothermic reactions in the unit 101. In such as case, the fluid heated in 100 forms, at least partly, the process fluid of 101. In some other configurations, the fluid heated in 100 transfers its thermal energy to a process fluid used in the heat-consuming unit/process 101 to indirectly provide heat of reaction to said process. In an event of indirect heating, the fluid heated in 100 may be same or different from the process fluid used in the heat-consuming unit/process 101; however, typically it is different. In configurations which involve said indirect heating, the thermal energy added into the fluid in the rotary apparatus 100 is transferred to the heat-consuming unit/process 101 through the use of so-called "heat exchanger"-type configurations represented, in the present context, with any existing fired heater, reactor or furnace, or any conventional heat exchanger device, wherein all these devices are viewed as heat-consuming units 101. In still further configurations, the fluid, such as gas, heated in the rotary apparatus 100 does not necessarily transfer its thermal energy to the heat-consuming unit 101, but the heat is used to run endothermic reactions within same or subsequent rotary apparatus unit(s) 100.

In some configurations, a number of rotary apparatuses 100 can be connected to several heat-consuming units 101 (e.g. reactors for hydrogen production or catalytic reformer reactors). Different configurations may be conceived, such as n+x rotary apparatuses connected to n units 101, wherein n is equal to or more than zero (0) and x is equal to or more than one (1). Thus, in some configurations, the facility 1000 may comprise one, two, three or four parallel rotary apparatuses 100 connected to the common heat-consuming unit 101; the number of rotary apparatuses exceeding four (4) is not excluded.

In embodiment, an amount of input energy $E_1$ is conducted into the at least one rotary apparatus 100 integrated, as a (rotary) heater unit, into the heat-consuming process facility 1000. The input energy E₁ preferably comprises
electrical energy. In embodiments, the amount of electrical
energy conducted as the input energy into the at least one
rotary apparatus integrated in the heat-consuming process
facility is provided within a range of about 5 to about 100
percent, preferably, within a range of about 50 to about 100
percent. Thus, the amount of electrical energy conducted as
the input energy into the at least one rotary apparatus
integrated in the heat-consuming process facility can con-
stitute any one of: 5, 10, 15, 20, 25, 30, 35, 40, 45, 50, 55,
60, 65, 70, 75, 80, 85, 90, 95, and 100 percent (from the total
energy input), or any intermediate value falling in between
the above indicated points.

Electrical energy can be supplied from external or internal
source. In practice, electrical input energy E1 supplied into
the apparatus can be defined in terms of electric power, the
latter being defined as a rate of energy transfer per unit time
(measured in Watt).

Particulars of some embodiments of the invention, as
implemented in the facility layout of FIG. 1, are described
along the following lines. The following designations are
used for the members.

Streams: 1. Feed fluid; 2. Preheated feed or feed mixture;
3. Feed heated by virtue of a rotary apparatus 100; 4. Feed
fluid further heated in an additional (booster) heater unit
configured to raise/enhance temperature through (exother-
mic) chemical reactions, for example; 5. Hot fluidic medium
exiting the heat-consuming process 101; 6. Fluidic medium
directed to purification; 7. Product stream and/or waste gas;
8. Reactive compound or a mixture of compounds, e.g.
reactive chemical(s) or a support fuel used to increase
temperature of the fluid/gas in the additional heater unit 103;
9. Process stream (solid, liquid, gas, vapor or a mixture
thereof) to be heated by the hot fluidic medium in the
heat-consuming process 101 (indirect heater applications);
10. Heated process stream (solid, liquid, gas, vapor or a
mixture thereof) sent for further processing and/or storage
(indirect heater applications); 11. Recycle stream exiting
from purification; 12. Feed stream to heat recovery; 13. Hot
fluidic stream from heat recovery. Sections (units): 100.
Rotary heater unit (rotary apparatus(es)); 101. Heat-consum-
ing operational (process) unit; 102. Pre-heater unit; 103.
Additional heating apparatus (booster heater); 104. Heat
recovery unit; 105. Purification unit.

The rotary apparatus 100 is configured to receive a feed
stream 1, hereafter, the feed 1. Overall, the feed 1 can
comprise or consist of any suitable fluid, such as liquid or
gas or a combination thereof, provided as a pure component
or a mixture of components. The feed can be a feedstock
liquid or gas, such as naphtha, LPG, methane, ethane,
natural gas, or any other suitable hydrocarbon-based feed-
stock, a process gas/working gas, a make-up gas (a so-called
replacement/supplement gas), a recycle gas, and the like.
Gaseous feed can include inert gases (steam, air, nitrogen
gas, and the like) or reactive gases (e.g. oxygen), flammable
gases, such as hydrocarbons, or any other gas. Selection of
the feed is process-dependent; that is, the nature of the
heat-consuming process 101 and, indeed, a specific industry/
an area of industry said heat-consuming process 101 is
assigned to implies certain requirements and/or limitations
on the selection of feed substance(s). Additionally or alter-
natively, feed 1 may include any one of: (water) steam,
nitrogen (N₂), hydrogen (H₂), carbon dioxide (CO₂), carbon
monoxide (CO), and ammonia (NH₃).

It is preferred that the feed 1 enters the apparatus 100 in
essentially gaseous form. Preheating of feed or conversion
of liquid and essentially liquid feed(s) into a gaseous form can be performed in an optional preheater unit 102 config-
ured as a (pre)heater apparatus or a group of apparatuses. In
the preheater unit 102, the feed stream(s) originally provided
in a gaseous form (e.g. the process gas or gases) can be
further heated (e.g. superheated). In the preheater unit 102,
the feed 1 can be vaporized if not already in gas form and
optionally superheated.

The preheater unit 102 can be any conventional device/
system configured to provide heat to fluidic substance. In
some configurations, the preheater unit 102 can be a fired
heater (viz. a direct-fired heat exchanger that uses hot
combustion gases (flue gases) to raise the temperature of a
fluidic feed, such as a process fluid, flowing through the coils
arranged inside the heater). Additionally or alternatively, the
preheater unit 102 can be configured to exploit energy made
available by the other units in the heat-consuming facility
(for example by extracting thermal energy from hot stream
13 arriving from heat recovery). The preheater unit 102 can
thus be configured to utilize, steam-, electricity and/or e.g.
waste heat streams (not shown).

Depending on the heat-consuming process and related
equipment, the feed stream 1 used to produce the heated
fluidic medium by virtue of the rotary heater unit (the
apparatus 100) may comprise a virgin feed (fresh feed)
and/or a recycle stream(s). Hence, the feed 1 can consist of
any one of fresh feed, recycle (fluidic) stream, and a mixture
thereof. Stream 2 representing (pre)heated feed may include,
in addition to the feed 1, all recycle streams, such as those
arriving from a purification section 105 and/or a heat recov-
ery section 104.

In the rotary heater unit/the rotary apparatus 100, the
temperature is raised to a level which is required by the
heat-consuming process 101 or to a maximum level
achieved by the rotary apparatus. In an event the temperature
rise achieved by the rotary apparatus 100 is not sufficient for
the heat-consuming process and/or if, for example, the
temperature of the fluid needs to be raised again after it has
transferred its heat to the heat-consuming process, further
temperature rise can be achieved by virtue of arranging
additional heater units (100B, 103), further referred to as
"booster" heater(s), downstream of the rotary heater unit 100
(100A); rf. description to FIG. 2B. Each additional heater
unit comprises or consists of an additional heating apparatus
implemented according to the description below.

In heat-consuming processes associated with multi-stage
petrochemical production, the main sources of heat con-
sumption are heating of working fluids and/or associated
equipment and endothermic reactions (reactions that require
external energy to proceed). In some applications it is
feasible to recover heat from heat-consuming processes 101.
Heat recovery section is indicated on FIG. 1 with reference
number 104. Recovered heat can be further used for heating
the feed stream 1 and/or a recycle stream (separate recycle
stream is indicated on FIG. 1 with ref. no. 11).

Heat recovery may be arranged through collecting gases
exiting the process unit 101 and recycling these gases to the
preheater unit 102 and/or the rotary apparatus 100. Heat
recovery installation 104 may be represented with at least
one heat exchanger device (not shown). Heat exchangers
based on any appropriate technology can be utilized. Heat
recovery may be optional for heating feed gas if the heat is
consumed elsewhere or if it is not possible to recover heat
due to safety- or any other reason.

In the facility layout 1000, the heat recovery unit 104 can
be arranged before and/or after the preheater 102. In the
latter configuration, the heat recovery unit 104 is arranged to
recover heat from the hot fluidic medium (stream 5) flowing from the heat-consuming process 101, which may be further utilized to heat the feed stream 1 and recycle stream 11. On the other hand, when the heat recovery unit 104 is arranged before the preheater 102, the feed 1 is first led to the unit 104 (as stream 12) and then returned to preheating 102 as stream 13. In such a case, unit 104 acts as a first preheater.

In some instances, gases require purification, e.g. from dust and fine particles, before being directed to heat recovery. Purification can be done by a series of filters, for example, arranged before the heat recovery section 104 (not shown). Additionally or alternatively the gases exiting the process unit 101 may be directed to a purification unit 105 (bypassing heat recovery 104), and, after purification, returned to heat recovery (not shown).

Process gas may contain in addition to value products also unwanted impurities and side products which may accumulate and/or be harmful for heater apparatus(-es) 100, 103 and/or the process units 101 causing corrosion and poisoning catalytic beds. Purification and separation of streams discharged from heat-consuming processes 101 is performed in the purification unit 105. Unit 105 can comprise a number of appliances, such as filters, cyclones etc., adapted to mechanically remove dust and solid particles. Any conventional purification/separation methods and devices may be utilized. Exemplary purification/separation methods include, but are not limited to: cryogenic separation methods, membrane processes, Pressure Swing Adsorption (PSA), distillation, absorption, and any combination of these methods. The unit 105 may also comprise device configured to increase gas pressure by compression, for example. Typically, purification units 105 operate at lower temperatures than the process units 101; therefore, prior to entering the purification unit, a product gas stream is cooled down (in the heat recovery 104, for example). To minimize the extent of deterioration of reactor beds in 101, it is also important to control composition of the recycle gas 11.

Purification unit 105 can be further adapted to purify waste gas(es), e.g. carbon dioxide, for further carbon capture. Waste gases discharged from the refining and/or petrochemical facility as stream 7 (FIG. 1) can thus be further directed to carbon capture (not shown). Suitable methods for purification of waste gases include for example PSA, distillation, absorption, etc.

Heated fluidic medium required for carrying out the heat-consuming process(es) 101 is generated by virtue of at least one rotary apparatus 100.

In an embodiment, the heated fluidic medium is generated in the rotary apparatus 100, where an amount of thermal energy is added directly into fluidic medium propagated through said apparatus. In such an event, the heated fluidic medium generated in the rotary apparatus may be for example a process gas, such as a hydrocarbon-containing gas (e.g. a methane-containing feed gas, natural gas, a mixture thereof, or another feed (see FIG. 1, streams 1-4, particularly stream 2), while the hot fluidic medium 5 that exits the heat-consuming unit 101 represents a product-containing stream (e.g. a cracked gas). In direct heating, streams 1-5 relate to a working- or process fluid.

The heated fluidic medium generated in the rotary apparatus can be further used as a carrier to transfer thermal energy to the heat-consuming process 101, configured to implement or mediate conversion of methane-containing feed to hydrogen. For example, an inert gas such as air, nitrogen or steam ($H_2O$) can be heated in the rotary apparatus 100 and further used to convey the heat generated by the rotary apparatus to a reactor or furnace adapted to perform a hydrogen production process 101. In this regard, generation of a heated medium (e.g. fluidic streams exploited by the process 101) can be performed outside the rotary apparatus through a process of heat transfer between the heated fluidic medium generated in the rotary apparatus and a suitable medium exploited by the process 101 and thus bypassing the rotary apparatus. In the process or processes related for example to olefin production, generation of the heated hydrocarbon-containing feed gas outside the rotary apparatus is implemented through a process of heat transfer between the heated fluidic medium other than the hydrocarbon-containing feed gas generated in the rotary apparatus (e.g. steam, air, nitrogen, etc.) and a stream of hydrocarbon-containing feed gas bypassing the rotary apparatus. FIG. 1 thus shows stream 9 (a process stream) bypassing the rotary apparatus 100 and designating, in present context, the hydrocarbon-containing feed/process stream, while streams 1-4 arriving to the process unit 101 via the rotary heater 100 designate fluidic medium (e.g. steam or other inert heating media) directed to the process unit 101 for heating the "cold" process stream 9. Use of inert hot gases as heating media in indirect heating applications is preferred when the process fluids to be heated are at high pressure or under vacuum. Stream 10 represents a "hot" process stream, respectively. In an event the unit 101 is a steam cracking unit, stream 10 represents the product (olefin)-containing stream, and stream 5 represents, in turn, a stream of inert fluidic medium (same as 1-4) exiting the unit/process 101. In indirect heating, streams 9 and 10 relate to a working- or process fluid, whereas streams 1-5 represent a heat transfer medium. Hence, in indirect heating, the unit 101 acts as a "heat-exchanger" type of device which enables transfer of thermal energy between two fluids flowing therethrough without any direct contact between said fluids.

The rotary apparatus 100 configured for generating the heated fluidic medium to be supplied into the refining and/or petrochemical facility according to the embodiments comprises a rotor comprising a plurality of rotor blades arranged into at least one row over a circumference of a rotor hub or a rotor disk mounted onto a rotor shaft, and a casing with at least one inlet and at least one exit, the rotor being enclosed within the casing. In the apparatus 100, an amount of thermal energy is imparted to a stream of fluidic medium directed along a flow path formed inside the casing between the inlet and the exit by virtue of a series of energy transformations occurring when said stream of fluidic medium passes through the at least one row of rotor blades when propagating inside the casing of the rotary apparatus, between the inlet and the exit, whereby a stream of heated fluidic medium is generated.

Implementation of the rotary apparatus 100 may generally follow the disclosures of a rotary reactor apparatus according to the U.S. Pat. No. 7,232,937 (Bushuev), -U.S. Pat. No. 9,494,038 (Bushuev) and U.S. Pat. No. 9,234,140 (Seppälä et al), and of a radial reactor apparatus according to the U.S. Pat. No. 10,744,480 (Xu & Rosic), the entire contents of which are incorporated by reference herewith. Any other implementation, which can be configured to adopt the method according to the embodiments, can be utilized.

In the patent documents referenced above, the rotary turbomachine-type apparatuses were designed as reactors for processing hydrocarbons, in particular, for steam cracking. General requirements for these applications are: rapid heating of gases, high temperature, short residence time, and plug flow (a flow model which implies no axial mixing). These requirements have led to designs where the turbomachine type reactors have several heating stages accommodated in a relatively small volume.

The present disclosure is based on an observation that the rotary apparatus (including, but not limited to the ones referenced above) can be electrified and used as a heater to generate the heated fluidic medium further supplied in the heat-consuming process 101, such as a process or processes related to oil refining and production of petrochemicals. By integration of the rotary apparatus heater unit(s) into the heat-consuming process or processes, significant reductions in greenhouse gas- and particle emissions can be achieved. By way of example, the rotary apparatus can replace fuel-fired heaters in steam methane reforming processes described hereinbelow. The temperature range can be extended from about 1000° C. (generally achievable with the above referenced reactor devices) to up to at least about 1700° C. and further up to 2500° C. Construction of the rotary apparatuses capable of achieving these high temperatures is possible due to an absence of aerodynamic hurdles.

The rotary apparatus 100 integrated into the refining and/or petrochemical facility according to the embodiments and configured to generate the heated fluidic medium for the method(s) according to the embodiment thus comprises the rotor shaft positioned along a horizontal (longitudinal) axis with at least one rotor unit mounted onto the rotor shaft. The rotor unit comprises a plurality of rotor (working) blades arranged over the circumference of a rotor hub or a rotor disk and together forming a rotor blade cascade. The rotary apparatus 100 thus comprises a plurality of rotor (working) blades arranged into at least one row over the circumference of a rotor hub or a rotor disk mounted onto the rotor shaft, and forming an essentially annular rotor blade assembly or rotor blade cascade.

In embodiments, the apparatus further comprises a plurality of stationary vanes arranged into an assembly disposed at least upstream of the at least one row of rotor blades. In this configuration, the rotary apparatus is operated such that the amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated.

In some embodiments, the plurality of stationary vanes can be arranged into a stationary vane cascade (a stator), provided as an essentially annular assembly upstream of the at least one row of rotor blades. The stationary vanes arranged into the assembly disposed upstream of the at least one row of rotor blades may be provided as stationary guide vanes, such as (inlet) guiding vanes (IGV), and be configured, in terms of profiles, dimensions and disposition thereof around the central shaft, to direct the fluid flow into the rotor in a predetermined direction such, as to control and, in some instances, to maximize the rotor-specific work input capability.

The rotary apparatus can be configured with two or more essentially annular rows of rotor blades (rotor blade cascades) sequentially arranged on/along the rotor shaft. In such an event, the stationary guide vanes may be installed upstream of the first row of the rotor blades, upstream of each row of rotor blades in the sequence, or upstream of any selected row of rotor blades in a sequential arrangement of the latter.

In embodiments, the rotary apparatus 100 further comprises a diffuser area arranged downstream of the at least one row of rotor blades (rotor blade cascade). In this configuration, the rotary apparatus is operated such that an amount of thermal energy is imparted to a stream of fluidic medium directed along a flow path formed inside the casing between the inlet and the exit by virtue of a series of energy transformations occurring when said stream of fluidic medium successively passes through the stationary guide vanes, the at least one row of rotor blades and the diffuser area, respectively, whereby a stream of heated fluidic medium is generated. The diffuser area can be configured with or without stationary diffuser vanes. In some configurations, a vaned or vaneless diffuser is arranged, in said diffuser area, downstream of the at least one rotor blade cascade. In some configurations, the diffuser can be implemented as a plurality of stationary (stator) vanes arranged into a diffuser vane cascade, provided as an essentially annular assembly downstream of the rotor.

The rotor, the stationary guide vanes and the diffuser area are enclosed within an internal passageway (a duct) formed in the casing.

In some configurations, such as described for example in U.S. Pat. No. 10,744,480 to Xu and Rosic, provision of a diffuser (device) may be omitted, and the diffuser area may be represented with an essentially vaneless portion of the duct (a so-called vaneless space) located downstream of the rotor and configured, in terms of its geometry and/or dimensional parameters, to diffuse a high-speed fluid flow arriving from the rotor.

Provision of the vaneless portion of the duct is common for all configurations of the rotary apparatus 100 described above. Depending on configuration, the vaneless portion (vaneless space) is arranged downstream of the rotor blades (rf. U.S. Pat. No. 10,744,480 to Xu and Rosic) or downstream of the diffuser vane cascade (rf. U.S. Pat. No. 9,494,038 to Bushuev and U.S. Pat. No. 9,234,140 to Seppälä et al). In some configuration described for example by Seppälä et al, arrangement of rotating and stationary blade rows in the internal passageway within the casing is such that vaneless portion(s) is/are created between an exit from the stationary diffuser vanes disposed downstream of the rotor blades and an entrance to the stationary guide blades disposed upstream of the rotor blades of a subsequent rotor blade cascade unit.

The terms "upstream" and "downstream" refer hereby to spatial and/or functional arrangement of structural parts or components with relation to a predetermined part- or component, hereby, the rotor, in a direction of fluidic flow stream throughout the apparatus (from inlet to exit).

Overall, the rotor with the working blade cascade can be positioned between the rows of stationary (stator) vanes arranged into essentially annular assemblies (referred to as cascades) at one or both sides of the working blade row. Configurations including two or more rows of rotor blades/rotor blade cascades arranged in series (in sequence) on/along the rotor shaft may be conceived with or without stationary blades in between. In an absence of stationary vanes between the rotor blade rows, the speed of fluidic medium propagating through the duct increases in each subsequent row. In such an event, a plurality of stationary vanes may be arranged into assemblies upstream of a first rotor blade cascade in said sequence (as stationary guide vanes) and downstream of a lastmost rotor blade cascade (as stationary diffuser vanes).

The row of rotor blades (rotor blade cascade) and a portion of the duct downstream of said rotor blades enclosed inside the casing optionally provided with an assembly of stationary diffuser vanes (diffuser area) may be viewed as a minimal process stage (hereafter, the stage), configured to mediate a complete energy conversion cycle. Hence, an amount of kinetic energy added to the stream of fluidic medium by at least one row of rotating blades is sufficient to raise the temperature of the fluidic medium to a predetermined value when said stream of fluidic medium exits the rotor blades and propagates, in the duct, towards a subsequent row of rotor blades, or enters the same row of rotor blades following an essentially helical trajectory formed within the essentially toroidal-shaped casing. The duct (which encloses the periphery of the rotor) is preferably shaped such, that upon propagation of the fluidic stream in the duct, the stream decelerates and dissipates kinetic energy into an internal energy of the fluidic medium, and an amount of thermal energy is added to the stream of fluidic medium.

The stationary guide blade row(s) disposed upstream of the at least one row of rotor blades prepare required flow conditions at the entrance of the rotating blade row (cascade) during the energy conversion cycle.

In some configurations, the process stage is established with the assembly of stationary guide vanes (upstream of the rotor blades), the row of rotor blades and the diffuser area arranged downstream of said rotor blades, the diffuser area provided as the essentially vaneless portion of the duct optionally supplied with diffuser vanes. During the energy conversion cycle, enabled with successive propagation of the stream of fluidic medium through the stationary guide vanes, the at least one row of rotor blades and the diffuser area, respectively, in a controlled manner, mechanical energy of the rotor shaft is converted into kinetic energy and further—into internal energy of the fluid, followed by the rise of fluid temperature. An amount of kinetic energy added to the stream of fluidic medium by rotating blades of the rotor is sufficient to raise the temperature of the fluidic medium to a predetermined value when said stream of fluidic medium exits the rotor blades and passes, inside the duct, through the diffuser area, whereupon the stream decelerates and dissipates kinetic energy into an internal energy of the fluidic medium, and an amount of thermal energy is added to the stream of fluidic medium. In the rotor blade row, the flow accelerates, and mechanical energy of the shaft and rotating blades is transferred to fluidic stream. In at least part of each rotor blade row the flow may reach a supersonic flow condition. In the diffuser area, the high-speed fluid flow arriving from the rotor is diffused with the significant entropy increase, whereby the flow dissipates kinetic energy into the internal energy of the fluidic substance, thus providing thermal energy into the fluid. If the flow upstream of the diffuser is supersonic, the kinetic energy of the fluidic stream is converted into internal energy of the fluid through a system of multiple shocks and viscous mixing and dissipation. An increase in the internal energy of the fluid results in a rise of fluid temperature. The energy conversion function may be performed by the vaneless portion of the duct located downstream of the rotor blades (rf. U.S. Pat. No. 10,744,480 to Xu & Rosic) and/or by an assembly of diffusing vanes, for example (rf. U.S. Pat. No. 9,234,140 to Seppälä et al).

The rotary apparatus 100 can be configured as a multistage- or a single-stage solution. Multistage configurations can be conceived comprising a number of rotor units (e.g. 1-5 rows of rotor blades sequentially arranged on/along the rotor shaft) alternating with common diffuser area(s) (vaneless or vaned).

In an exemplary configuration outlined in U.S. Pat. No. 9,234,140 to Seppälä et al, the rotary apparatus 100 can be implemented substantially in a shape of a ring torus, where a cross-section of the duct in the meridian plane forms a ring-shaped profile. The apparatus comprises a rotor unit disposed between stationary guide vanes (nozzle vanes), and stationary diffusing vanes. The stages are formed with rows of stationary nozzle vanes, rotor blades and diffusing vanes, through which the fluidic stream propagates, in a successive manner, following a flow path established in accordance with an essentially helical trajectory. In this configuration, fluidic stream circulates through the rotating rotor blade cascade a number of times while propagating inside the apparatus between the inlet and the exit. Similar ring-shaped configuration is described in U.S. Pat. No. 9,494,038 to Bushuev.

In another exemplary configuration outlined in U.S. Pat. No. 9,234,140 to Seppälä et al, the rotary apparatus 100 can be configured as an essentially tubular, axial-type turbomachine. In such configuration, the apparatus comprises an extended (elongated) rotor hub, along which a plurality of rotor blades is arranged into a number of sequential rows. The rotor is enclosed within the casing, inner surface of which is provided with the stationary (stator) vanes and diffuser vanes, arranged such that blades/vanes of the stator, rotor- and diffuser cascades alternate along the rotor hub in a longitudinal direction (along the length of the rotor shaft, for inlet to exit). Blades of the rotor cascade at certain position along the rotor in the longitudinal direction form the stage with the adjacent pairs of stationary guide (nozzle) vanes and diffusing vanes, respectively.

In described configurations, the subsequent stages have blade/vane-free space between them.

In still another exemplary configuration outlined in U.S. Pat. No. 10,744,480 to Xu and Rosic, the rotary apparatus 100 can be configured as a radial turbomachine that generally follows a design for centrifugal compressors or centrifugal pumps. The term "centrifugal" implies that fluid flow within the device is radial; therefore, the apparatus may be referred, in the present disclosure, as a "radial-flow apparatus. The apparatus comprises a number of rotor units mounted onto elongated shaft, wherein each rotor unit is preceded with stationary guide vanes. A vaneless portion of the duct shaped in a manner enabling energy conversion (U-bend or S-bend, for example) is located after the rotor unit(s). Additionally, configuration may comprise a separate diffuser device (vaned or vaneless) disposed downstream of the rotor.

In all configurations described above, the rotary apparatus 100 performs, in the method disclosed herein, in similar manner. In operation, the amount of input energy conducted into the at least one rotary apparatus integrated into the heat-consuming process facility is converted into mechanical energy of the rotor. Conditions in the rotary apparatus are adjusted such, as to produce flow rate conditions, at which an amount of kinetic energy added to the stream of fluidic medium by rotating blades of the rotor is sufficient to raise the temperature of the fluidic medium to a predetermined value when said stream of fluidic medium exits the at least one row rotor blades and passes through the duct and/or through the diffuser area to enter the subsequent row of rotor blades or the same row of rotor blades in accordance to the description above. The row(s) of rotor blades may be preceded with stationary guide vanes. Hence, the adjustable condition comprises adjusting at least a flow of fluidic medium propagating inside the casing of the rotary apparatus, between the inlet and the exit. Adjusting the flow may include adjusting such apparatus operation related parameters, as temperature, mass flow rate, pressure, etc. Additionally or alternatively, flow conditions can be adjusted by modifying shape of the duct formed inside the casing.

In some exemplary configurations, the rotary apparatus can be configured to implement a fluidic flow between its inlet(s) and outlet(s) along a flow path established in accordance with any one of: an essentially helical trajectory formed within an essentially toroidal-shaped casing, as discussed in any one of the patent documents U.S. Pat. No. 9,494,038 to Bushuev and U.S. Pat. No. 9,234,140 to Seppälä et al; an essentially helical trajectory formed within an essentially tubular casing, as discussed in the patent document U.S. Pat. No. 9,234,140 to Seppälä et al; an essentially radial trajectory as discussed in the patent document U.S. Pat. No. 10,744,480 to Xu & Rosic; and along the flow path established by virtue of the stream of fluidic medium in the form of two spirals rolled up into vortex rings of right and left directions, as discussed in the patent document U.S. Pat. No. 7,232,937 to Bushuev). The aerodynamic design of the rotary apparatus can vary.

The rotary apparatus utilizes a drive engine. In preferred embodiments, the apparatus utilizes electrical energy as the input energy and is therefore electric motor-driven. For the purposes of the present disclosure, any appropriate type of electric motor (i.e. a device capable of transferring energy from an electrical source to a mechanical load) can be utilized. Suitable coupling(s) arranged between a motor drive shaft and the rotor shaft, as well as various appliances, such as power converters, controllers and the like, are not described herewith. Additionally, the apparatus can be directly driven by gas- or steam turbine, for example, or any other appropriate drive device. In layouts involving parallel connection of a number of rotary apparatuses 100 to the common heat-consuming unit 101, one or more of said apparatuses may utilize different type of drive engine, e.g. the electric motor driven apparatuses can be combined with those driven by steam turbine, gas turbine and/or gas engine.

Electric power (defined as the rate of energy transfer per unit time) can be supplied into the rotary apparatus through supplying electric current to the electric motor used to propel a rotary shaft of the apparatus. Supply of electric power into the rotary apparatus can be implemented from an external source or sources (as related to the rotary heater unit/the apparatus 100 and/or the heat-consuming process facility 1000). Additionally or alternatively, electrical energy can be produced internally, within the facility 1000.

An external source or sources include a variety of supporting facilities rendered for sustainable energy production. Thus, electric power can be supplied from an electricity generating system that exploits at least one source of renewable energy or a combination of the electricity generating systems exploiting different sources of renewable energy. External sources of renewable energy can be provided as solar, wind- and/or hydropower. Thus, electric power may be received into the process from at least one of the following units: a photovoltaic electricity generating system, a wind-powered electricity generating system, and a hydroelectric power system. In some exemplary instances, a nuclear power plant may be provided as the external source of electrical power. Nuclear power plants are generally regarded as emission-free. The term "nuclear power plant" should be interpreted as using traditional nuclear power and, additionally or alternatively, fusion power.

Electricity can be supplied from a power plant that utilizes a turbine as a kinetic energy source to drive electricity generators. In some instances, electric power to drive the at least one apparatus 100 can be supplied from at least one gas turbine (GT) provided as a separate installation or within a cogeneration facility and/or a combined cycle power facility, for example. Electric power can thus be supplied from at least one of the following units: a combined cycle power facility, such as a combined cycle gas turbine plant (CCGT), and/or a cogeneration facility configured for electricity production combined with heat recovery and utilization through combined heat and power (CHP), for example. In some examples, the CHP plant can be a biomass fired plant to increase the share of renewable energy in the process described. Additionally or alternatively, supply of electric power can be realized from a spark ignition engine, such as a gas engine, for example, and/or a compression engine, such as a diesel engine, for example, optionally provided as a part of an engine power plant. Still further, any conventional power plant configured to produce electrical energy from fossil raw materials, such as coal, oil, natural gas, gasoline, and the like, typically mediated with the use of steam turbines, can be used to generate electrical energy as an input energy for the rotary apparatus 100. Also hydrogen can be utilized as a source of renewable energy, to be reconverted into electricity, for example, using fuel cells.

Any combination of the abovementioned sources of electric power, realized as external and internal sources, may be conceived. Importing low emission electric power from an alternative (external) source improves energy efficiency of the heat-consuming process facility.

Conducting input energy, comprising electrical power, into a drive engine of the rotary apparatus can be further accompanied with conducting mechanical shaft power thereto from a power turbine, for example, optionally utilizing thermal energy generated elsewhere in the facility 1000 or outside said facility. Shaft power is defined as mechanical power transmitted from one rotating element to another and calculated as a sum of the torque and the speed of rotation of the shaft. Mechanical power is defined, in turn, as an amount of work or energy per unit time (measured in Watt). In practice, the shaft power from the electric motor and the power turbine, for example, can be divided so that any one of those can provide the full shaft power or a fraction of it.

FIGS. 2A-2D show exemplary layouts for the rotary apparatus 100 representing the rotary heater unit or units within the facility 1000 with regard to preheater unit 102, temperature booster section 103, and heat recovery unit 104. The following citations are used for the members: 100, 100A, 100B—Rotary heater unit(s) (rotary apparatus(es)); 101—Heat-consuming unit/process; 102—Preheater unit; 103—Additional heating apparatus (booster heater).

Figure 2A:
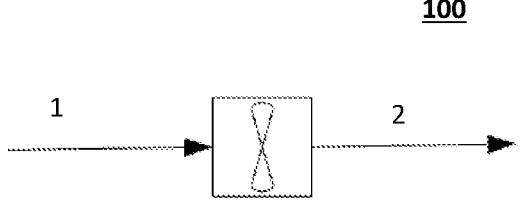
FIGS. 2A-2E are exemplary layouts of arranging rotary apparatus(es) 100 within the oil refining facility and/or a petrochemical production facility, according to the embodiments.

FIG. 2A schematically illustrates a basic implementation for the rotary apparatus 100 configured to input heat into a stream of fluidic medium (feed stream 1) directed therethrough. Heated stream exiting the apparatus 100 is designated with reference number 2, respectively. In basic implementation, the rotor system of the rotary apparatus 100 is aerodynamically configured so that a volume of fluid is heated to a predetermined temperature while propagating along the flow path formed in the casing of the apparatus 100, between inlet and exit (so called "one-pass" implementation). The apparatus 100 enables temperature rise (delta T, ΔT) within a range of about 10° C. to about 120° C., in some configurations—up to about 500° C., in one stage. Hence, in case of a multistage implementation, the fluid can be heated to 1000° C. in "one-pass" implementation (taken 100° C. temperature rise per stage in a 10-stage apparatus). Since residence time the fluidic medium spends to pass through the apparatus stage is in scale of fractions of seconds, such as about 0.01-1.0 milliseconds, fast and efficient heating can be achieved already in the basic configuration. Temperature rise can be optimized as required.

Figure 2B:
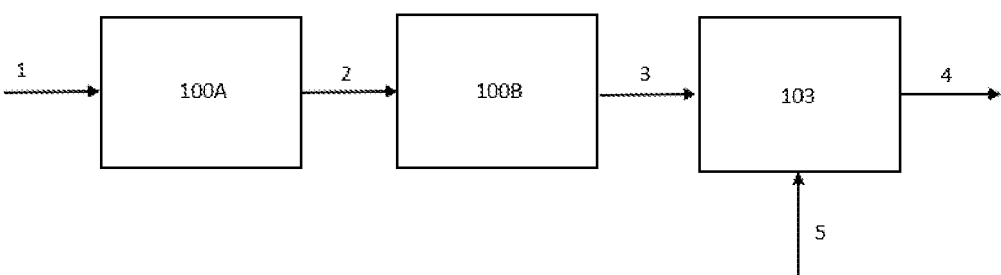

FIG. 2B illustrates a basic concept involving a so-called booster heating. Booster heating is an optional method to heat a fluidic medium, such as a process gas, for example, beyond capability of a standalone heater apparatus 100.

Temperature boost may be viewed as thermal, chemical or both. In a first configuration (a) also referred to as a "thermal boost", an additional rotary heater apparatus (designated as 100B on FIGS. 2B, 2C and 2D) is arranged downstream of a "primary" rotary heater apparatus (designated as 100A on FIGS. 2B, 2C and 2D). Apparatuses 100A, 100B are generally recognized, within the present disclosure, as rotary heater units 100. Generation of the heated fluidic medium is can thus be achieved by provision of at least two sequentially connected rotary apparatuses 100A, 100B, wherein the stream of fluidic medium (rf. feed stream 1) is heated to a predetermined temperature in at least a first rotary apparatus (100A) in a sequence, referred to hereby as a primary heater, and wherein said stream of fluidic medium (rf. stream 2) is further heated in at least a second rotary apparatus (100B) in the sequence by inputting an additional amount of thermal energy into the stream of fluidic medium "preheated" in the first rotary apparatus 100A and propagating through the second rotary apparatus 100B (rf. stream 3). The apparatus 100B is therefore referred to as a booster heater. The apparatuses 100A, 100B may be identical and vary in terms of size or internal design. A sequence of two or more booster apparatuses such as 100B can be arranged after a primary heater 100A. Booster apparatuses can be arranged in parallel or in series, or in any combination that allows for optimization of rotating speed and aerodynamics thereof.

In a second, additional or alternative, configuration (further referred to as "chemical boost"), the additional heating apparatus designated as 103 (FIGS. 1, 2B) is adapted to receive, into the stream of fluidic medium propagating therethrough, reactive components 5, such as for example combustible fuel, to provide heat by exothermic reactions prior to directing said stream of fluidic medium to the heat-consuming process 101 of refining and/or production of petrochemicals. In this configuration, temperature boosting can be achieved by virtue of introducing (e.g. by injecting) a reactive chemical or chemicals 5 into to the stream of fluidic medium directed through the additional heater unit/ heating apparatus 103. It is noted that stream 5 of FIG. 2B corresponds to stream 8 shown on FIG. 1.

The reactive chemical-based booster heater unit 103 may be located after the thermal booster heater unit 100, 100B (FIG. 2B) or directly after the primary heater 100, 100A (FIG. 1). The reactive chemical (reactant) 5 may include combustion gases, such as hydrogen gas, hydrocarbons, ammonia, oxygen, air, other gas and/or any other appropriate reactive compound, optionally a catalyst. In the unit 103, by virtue of exothermic reactions, the fluidic stream can be heated to a level, which is typically not possible to achieve by a single rotary apparatus not involving chemical-mediated heating (rf. stream 4). For example, a fuel gas, such as hydrogen, can be introduced into an oxygen-containing process gas, such as air. At elevated temperatures, hydrogen and oxygen enter an exothermic reaction to produce water molecules (hydrogen combustion).

Fuel gas can be injected into the booster heater unit 103 through burners along with air (or enriched oxygen) to rise the temperature of gases. If heated gas contains flammable gases and it is possible to consume these gases for heating only air/or oxygen can be added. Process gases can contain $H_2$, $NH_3$, CO, fuel gases (methane, propane, etc.) which may be burned to generate heat. Other reactive gases can be injected to generate heat if feasible.

The additional heater 103 adapted for chemical boost may be configured as a piece of pipe or as a chamber where exothermic reactions take place, and/or it can comprise as at least one rotary apparatus 100 arranged to receive reactive compounds to accommodate exothermic reactions to produce additional heat energy. The booster section 103 can thus comprise at least one rotary apparatus 100. Optionally, the reactive chemicals can be injected directly to the heat consuming process 101 (not shown). Additionally or alternatively, the reactive chemical mediated boost can be implemented in a single apparatus 100, 103, modified accordingly.

In an arrangement involving booster heating, the temperature of the stream of fluidic medium preheated to a predetermined temperature in a first rotary apparatus (100A) can be further raised to a maximum limit in subsequent heater units (100B, 103). By way of example, the temperature of the stream of fluidic medium preheated to about 1700° C. in a primary heater (100A) can be further raised in subsequent heater units (100B, 103) up to 2500° C. and beyond.

Mentioned concepts can be used separately or combined, so that the reactive chemical 5 can be introduced into any one of the apparatuses 100 connected in parallel or in series (in sequence). Provision of the booster heater(s) is optional.

In additional or alternative configurations, preheating and additional heating can be implemented in the same apparatus 100 (not shown). This can be achieved in multistage configurations, comprising a number of rotor units (e.g. 1-5 rows of rotor blades sequentially arranged on/along the rotor shaft) alternating with common diffuser area(s) (vaneless or vaned).

Additionally or alternatively, booster heating can be used for example in an event, when the temperature of the fluid once heated in the rotary apparatus(es) 100, needs to be raised again after it has transferred its heat to the heat-consuming process 101. Exemplary configuration comprising a number of rotary heater apparatuses 100 (100A, 100B and/or optionally 103) alternating with heat-consuming units 101 is shown on FIG. 2E. Such configuration can be utilized for example for a series of successive catalytic endothermic reactors, such as in the processes of catalytic reforming, where the temperature drops reactor-wise and needs to be raised again between the reactors (see also description to FIG. 5A).

Figure 2C:
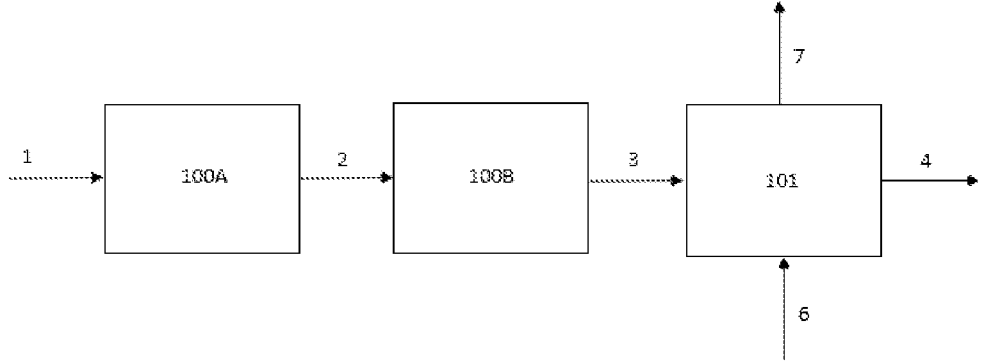
Figure 2D:
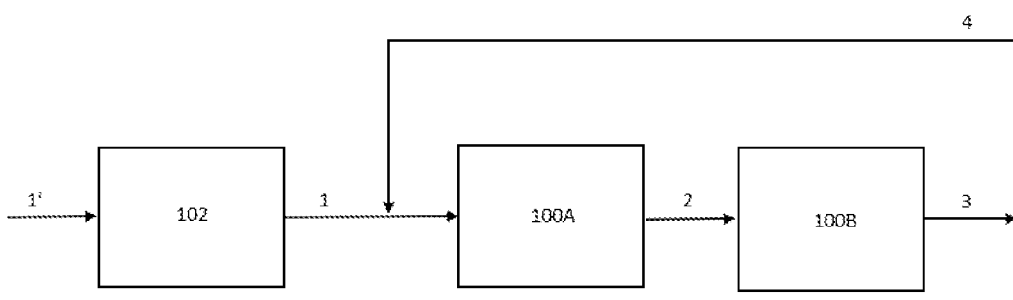

Upon connecting the at least two rotary apparatuses, such as 100A, 100B, and optionally 103 (in an event 103 is implemented as a rotary apparatus 100) in parallel or in series, a rotary apparatus assembly can be established (see for example FIGS. 2B-2D). Connection between the rotary apparatuses 100 implemented as "primary" heater(s) 100A or "booster" heater(s) 100B, 103 can be mechanical and/or functional. Functional (in terms of achievable heat input, for example) connection can be established upon association between at least two individual, physically integrated- or non-integrated individual apparatus units. In a latter case, association between the at least two rotary apparatuses can be established via a number of auxiliary installations (not shown). In some configurations, the assembly comprises the at least two apparatuses connected such, as to mirror each other, whereby said at least two apparatuses are at least functionally connected via their central (rotor) shafts. Such mirrored configuration can be further defined as having the at least two rotary apparatuses 100 mechanically connected in series (in a sequence), whereas functional connection can be viewed as connection in parallel (in arrays). In some instances, the aforesaid "mirrored" arrangement can be further modified to comprise at least two inlets and a common exhaust (discharge) module placed essentially in the center of the arrangement.

Rotary apparatuses (100A, 100B, 103, rf. FIG. 2B) can be assembled on the same (rotor) shaft. Each rotary apparatus can be optionally provided with a separate drive (a motor) which allows independent optimization of the apparatuses. When two or more separate rotary apparatuses are used, construction costs (materials etc.) can be optimized in view of operation temperature and pressure.

Additionally or alternatively, at least one rotary apparatus within the assembly can be designed to increase the pressure of the fluidic stream. Hence, the at least one rotary apparatus in the assembly can be assigned with a combined heater and blower functionality.

Additionally or alternatively, a stream containing reactive- or inert gases can be fed to the rotary apparatus 100 (not shown) or to any equipment downstream of said apparatus (e.g. in the heat-consuming process section 101). Thus, the reactive gases may also be injected directly to the heat-consuming process unit 101, if the latter is configured as the heat-consuming unit, such as a reactor. In a number of applications, a support fuel may be injected directly to the process unit 101 to generate heat and/or to take part in the reactions.

Figure 3A:
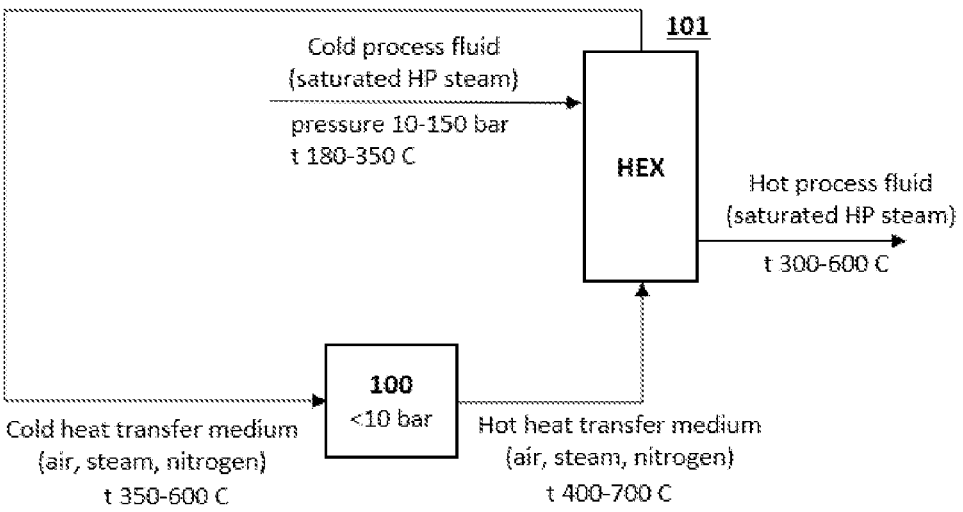
FIGS. 3A-3C schematically illustrate integration of the rotary apparatus 100 into a facility configured to implement a heat-consuming process 101.
Figure 3B:
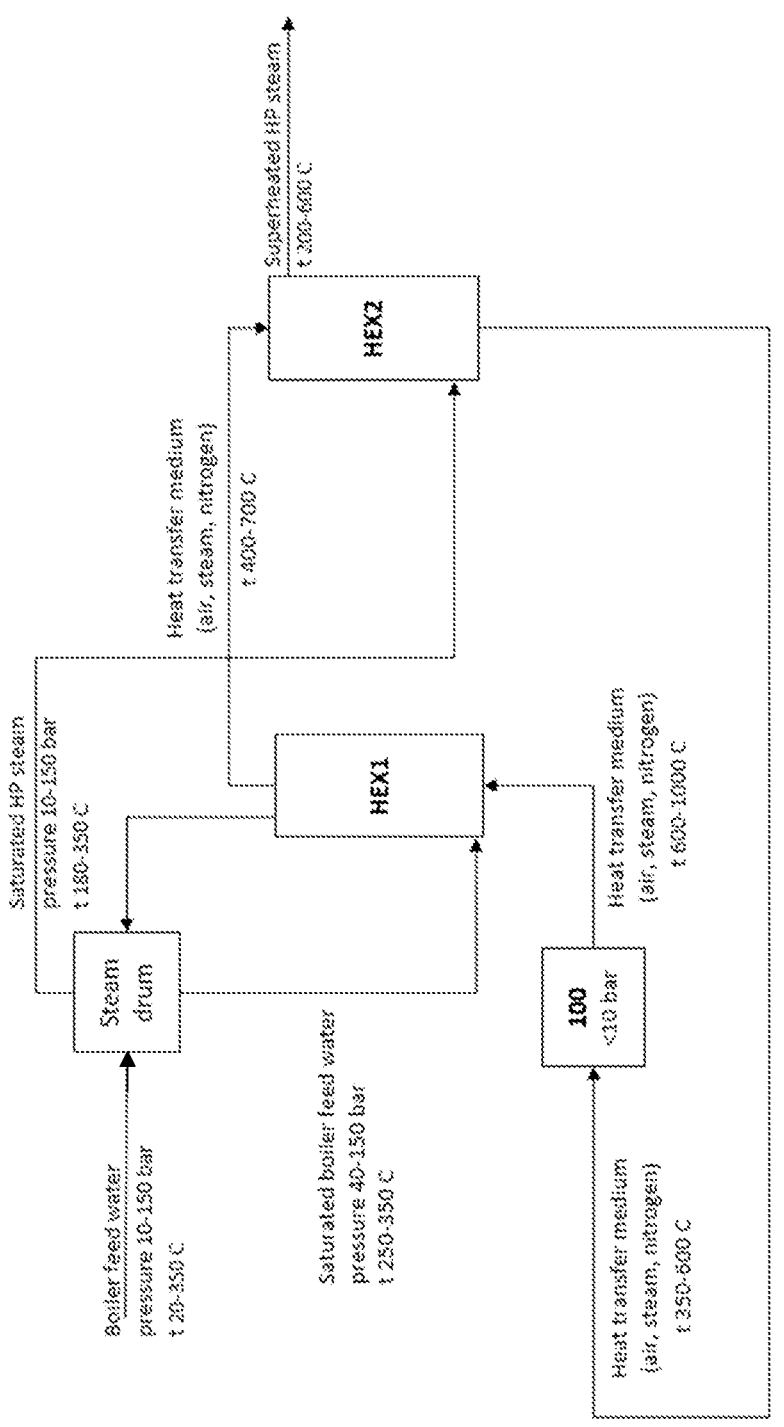
Figure 3C:
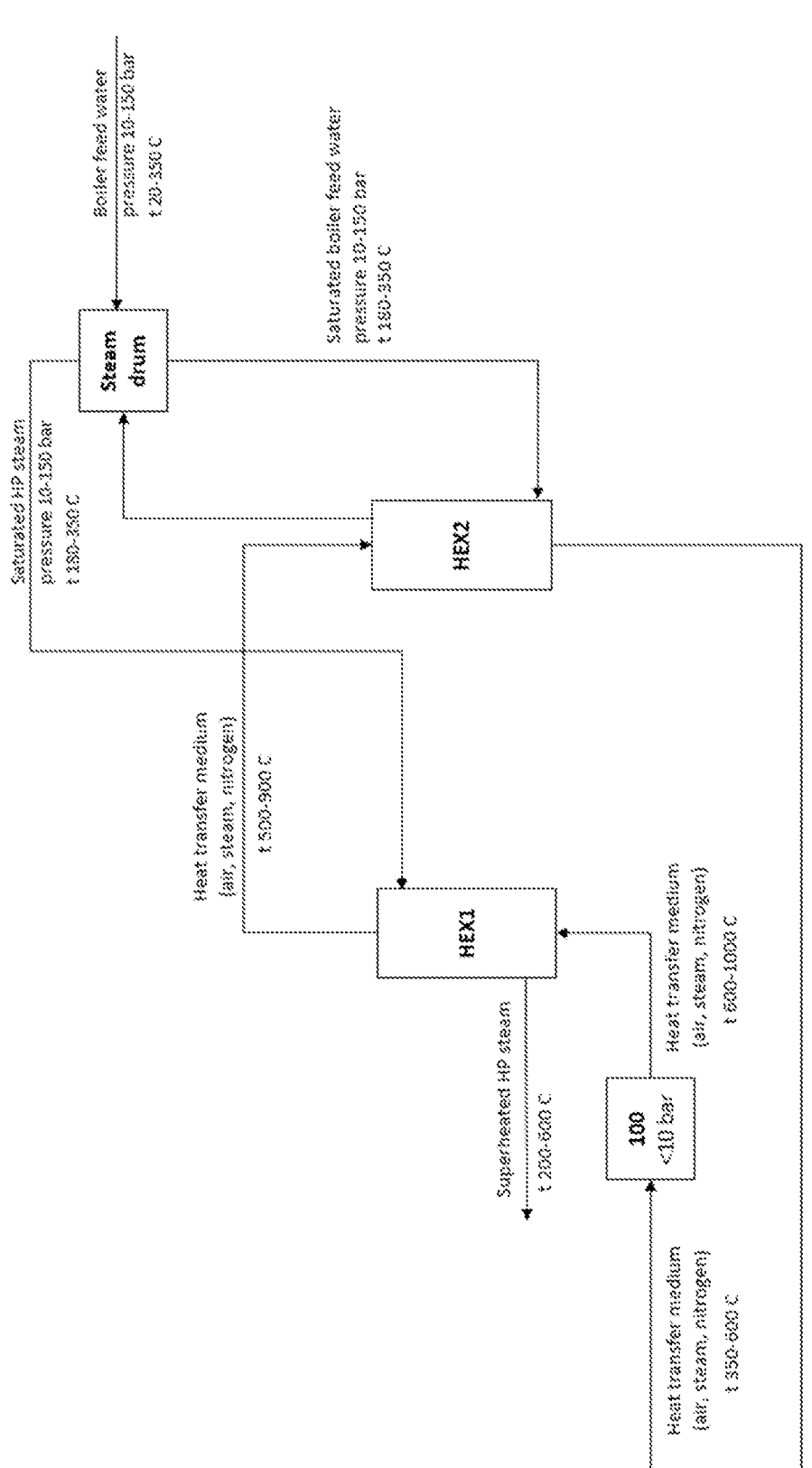

FIG. 2C illustrates the use of the rotary heater apparatuses 100A, 100B (optional) with indirect process heating (see also description to FIGS. 3A-3C). The rotary apparatus 100 (100A, 100B) can be used for indirect heating of fluids in the heat-consuming unit 101, wherein heat is transferred between two non-mixing fluids as in heat exchanger-type configurations. Hence, fluids, such as gases or liquids, can be evaporated (vaporized) or superheated in a feasible heat exchanger arrangement 101 against fluid heated in the rotary apparatus 100. The heat-consuming unit 101 configured to accommodate a heat-consuming process can be represented with any (existing) fired heater, reactor or furnace, or any conventional heat exchanger device. Type of said "heat exchanger" configuration (101) can be selected as needed for optimal heat transfer. Heating gas (see streams 1-3) can be selected to be most suitable for heating and safety (for example: steam, $N_2$, air). Gas heated in the rotary apparatus 100A, 100B can be close to atmospheric pressure or pressure can be raised to improve heat transfer. Heat transfer medium 3 heated in the apparatus 100 (rf. stream 3 exiting 100B) is directed to the heat-consuming process 101, where heat is transferred from stream 3 to a "cold" process stream 6 to produce a "hot" process stream 7. Stream 4 designates the (inert) heat transfer medium outflow, respectively. In an event the unit 101 is a steam cracker for olefin production, stream 6 will designate a hydrocarbon-containing feed stream (e.g. naphtha, ethane, etc.) and stream 7 a cracked product stream, respectively.

Process streams 6 and 7 of FIG. 2C thus correspond to streams 9 and 10 of FIG. 1, respectively (indirect heating configuration); while heat transfer medium streams 3 and 4 of FIG. 2C correspond to streams 3 (optionally 4) and 5, respectively (indirect heating configuration).

Using the rotary apparatus 100 allows for optimization of temperature difference in heat exchanger configurations (represented hereby by the heat-consuming units 101), whereby the size of the unit 101 (configured as a heat exchanger, a reactor, a furnace, a heater, etc.) and possible unwanted reactions (fouling, coking) occurring on its surfaces due too high surface temperature can be minimized. High surface temperatures may cause excess fouling in process heaters. Indirect heating can be used for example to replace process heaters in various applications related to refining and/or production of petrochemicals, such as for example in oil refining for the evaporation of heavy streams where operating pressure is normally low.

FIG. 2D illustrates the rotary heater apparatus 100A with a preheater 102 and with a recycle process fluid (stream 4) recycled from the heat consuming process (not shown). Preheater can be electric, fired, combustion engine, gas turbine, etc. or it can be a heat exchanger for recovering excess heat from any high temperature flow in the process. Provision of the preheater 102 is optional. The concept can further include an optional booster heater 100B downstream of the apparatus 100A. Stream 1' designates a (feed) fluid sent to the preheater 102. Said fluid is further propagated through the rotary apparatuses 100A, 100B, where the feed is heated and sent to the heat-consuming process at stream 3.

Any one of the rotary apparatuses 100A, 100B can be equipped with a fluid recycle arrangement (see stream 4, FIG. 2D). Any combination of the rotary apparatuses the fluid recycle arrangement can be conceived. Recycling is made possible through recirculation of the streams of fluidic medium by the at least one rotary apparatus.

In some configurations, the rotary apparatus 100 can utilize flue gases with low oxygen content exhausted from a conventional fired heater. In such an event, hot flue gases exhausted from the fired heater are mixed with recycle gases (stream 4, FIG. 2D) to be used for heating in the rotary heater 100, 100A. Oxygen content in the flue gases used in described case is preferably below a flammability limit to provide safe heating.

Further examples of indirect heating supplied to the heat-consuming process 101 by virtue of at least one rotary apparatus 100 in the refining and/or petrochemical facility are illustrated by FIGS. 3A-3C. FIG. 3A illustrates a layout, where the rotary apparatus 100 is integrated into a heat-consuming process as a (super)heater adapted to superheat high-pressure steam; and FIGS. 3B and 3C illustrate layouts, where the rotary apparatus 100 is integrated into heat-consuming process(es) as a high-pressure steam generator and a (super)heater adapted to generate high-pressure steam and to superheat the same.

Superheating of high-pressure steam is an exemplary process of indirect heating. High-pressure steam (HPS) refers to steam at elevated pressures, typically greater than 1 bar (0.1 MPa) above atmospheric pressure. Superheated steam is a steam at a temperature higher than its vaporization temperature. Superheated high-pressure steam is used for example in a process industry to power compressors and other rotating equipment. Superheated high-pressure steam is conventionally produced in fired furnaces (rf. FIG. 4A), where steam is superheated in tubes that are exposed to hot flue gases or to natural gas firing, for example.

Superheating of process fluids, such as steam, can be generally implemented in the rotary apparatus 100 (not shown). However, when the pressure of process fluids to be heated is elevated for example to above 10 bar (1 MPa), the rotary apparatus must be designed to operate at high pressures, which would increase its material requirements and complicate its technical solutions, such as for example sealing, and hence increase the total cost of the apparatus. Therefore, to efficiently heat process fluids at pressures exceeding about 10 bar, it is beneficial to apply the concept of indirect heating schematically visualized by FIG. 3A. In the layout of FIG. 3A, a heat transfer medium (inert gas such as air, nitrogen, steam, carbon dioxide or any other suitable gas) provided at relatively low pressure is heated in the rotary apparatus 100 and is further used to transfer its thermal energy to the process fluid (high-pressure steam)

flowing through a heat-consuming unit 101 provided in a heat exchanger configuration (HEX) (rf. FIG. 2C), whereby said high-pressure steam becomes superheated. This way overall cost of the heating system will be markedly decreased.

In the layout of FIG. 3A, the rotary apparatus 100 is used to heat fluids such as air, steam, carbon dioxide or nitrogen at relatively low pressures, for example below 10 bar (1 MPa). Inflow stream temperature entering the apparatus 100 ("cold heat transfer medium") is about 350-600° C.; and the outflow stream temperature exiting 100 ("hot heat transfer medium") is about 400-700° C., respectively. "Cold" process fluid, provided as a saturated high-pressure steam, enters the heat-consuming unit 101 in heat exchanger (HEX) configuration at about 180-350° C. (at a pressure 10-150 bar (1-15 MPa) to be superheated to about 300-600° C., whereby superheated high-pressure steam is produced ("Hot process fluid"; t about 300-600° C.). It is noted that temperature and pressure ranges may vary depending on a heat-consuming process and the system layout. By way of example, to achieve superheating temperatures, HPS at 60 bar (6 MPa) should be heated to about 450-470° C.; HPS at 100 bar (10 MPa)—to about 510-540° C., typically, 530° C.; and HPS at 120 bar (12 MPa)—to about 530-550° C. In order to allow heat transfer between fluids, the temperature of heated inert gas discharged from the rotary apparatus 100 must exceed the target temperature of (superheated) process fluid.

Inert gas discharged from the rotary apparatus 100 is led into the heat-consuming unit 101 provided, in the layout of FIG. 3A, as a heat exchanger that allows transfer of thermal energy from the heat transfer medium (inert fluid/gas heated in 100) to the process fluid (HPS) through heat transfer surface(s). HPS introduced into the heat exchanger 101 at a saturation temperature or slightly above that receives thermal energy from the heat transfer medium and becomes superheated. On the other hand, the heat transfer medium cools down as it donates its heat to the process stream (HPS). Cooled heat transfer medium can be reintroduced into the rotary apparatus 100 to improve thermal efficiency of the system.

The layout of FIG. 3A presupposes that (saturated) high-pressure steam is readily available, such as produced in steam drum, for example (steam drum is not shown on FIG. 3A). In cases where only water is available, the rotary apparatus 100 can be used, in addition to HPS superheating, also for generation of high-pressure steam through the concept of indirect heating.

FIGS. 3B and 3C schematically visualize co-current and counter-current concepts, respectively, for high-pressure steam generation and superheating using the rotary apparatus 100. In the layouts of FIGS. 3B and 3C, the rotary apparatus 100 is adapted to heat fluid(s) that provide(s) thermal energy for more than one heat exchanger within a heat-consuming facility (1000, not shown). Each of the heat exchangers (HEX1, HEX2) may be considered to represent a heat-consuming unit (designated with 101 on FIG. 2C).

In layouts of FIGS. 3B and 3C, one of the heat exchangers (HEX1 in FIG. 3B and HEX2 in FIG. 3C) operates as thermosiphon and partially vaporizes water (boiler feed water) against fluid heated in the rotary apparatus 100. Water is provided at a saturation temperature and at the same or slightly higher pressure than the target high-pressure steam (rf. stream "saturated boiler feed water"). Partially vaporized/evaporated water (or water-steam mixture) is taken to a steam drum where vaporized high-pressure steam is separated from unvaporized liquid phase, such as water. This water flows back to the heat exchanger. A make-up water stream is typically introduced into the steam drum to compensate for high-pressure produced therein.

Another heat exchanger (HEX2 in FIG. 3B and HEX1 in FIG. 3C) is configured to superheat (saturated) high-pressure steam arriving from the steam drum against the fluid heated in the rotary apparatus 100 in a manner described for FIG. 3A. Inlets and outlet temperatures of the heat exchangers must be selected such as to enable heat transfer from the heat transfer medium (inert fluid heated in 100) to boiler feed water (in a process of water evaporation/generation of high-pressure steam) or high-pressure steam (in a process of HPS superheating), but not the other way around, i.e. the temperature of heat transfer medium must exceed the target temperature of a process fluid to be heated. This is visualized on FIG. 3B, where the temperature of heat transfer medium (600-1000° C. at HEX1 inlet and 400-700° C. at HEX2 inlet) is adjusted to exceed temperatures of the saturated HPS (180-350° C.) produced in HEX1/steam drum and sent to HEX2 and of the superheated (saturated) HPS (200-600° C.), produced in HEX2. FIG. 3C, in turn, shows that the temperature of heat transfer medium (600-1000° C. at HEX1 inlet and 500-900° C. at HEX2 inlet) exceed both the temperatures of saturated HPS (180-350° C.) produced in HEX2/steam drum and sent to HEX1 and of the superheated (saturated) HPS (200-600° C.), produced in HEX1.

In same manner as described for FIG. 3A, the heat transfer medium cools down as it provides its thermal energy for the processes of evaporation and superheating, and so cooled heat transfer medium can be reintroduced into the rotary apparatus 100 to improve thermal efficiency of the system.

The method according to the embodiments is applicable, fully or partly, to a variety of heat-consuming processes 101 employed in refining and petrochemical industries, as will be elucidated herein below based on a number of non-limiting examples.

The following description illustrates the embodiments of the invention in relation to oil and petrochemical industry fired heater furnaces 101 (rf. FIG. 4A showing a conventional furnace). The fluid that is heated in such a furnace can be gas or liquid or a mixture of gas and liquid. Typically, applications include heating in the furnace in order to:

Initiate thermal reaction in the fluid (for example, in steam cracking);

Pre-heat the fluid to a reaction temperature (for example, in catalytic reforming of gasoline);

Pre-heat the fluid for flash distillation (for example, in crude oil distillation pre-heat);

Heat a thermal heating oil to be further (externally) used as heat transfer medium (for example, in a distillation re-boiler).

According to the embodiments, the rotary apparatus 100 can be used instead of a fired heater or a furnace, as a direct heater for gases or as an indirect heater for liquids or for evaporation.

Figure 4B:
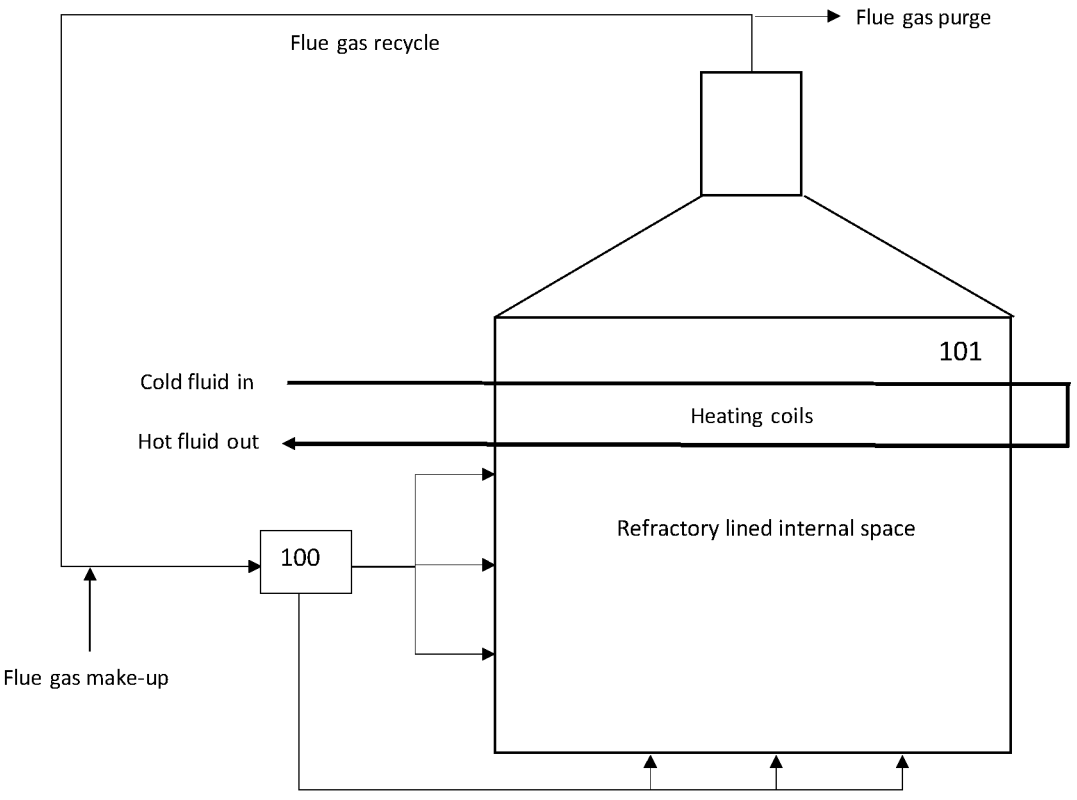
FIG. 4B illustrates an arrangement comprising the furnace 101 and the rotary apparatus 100, according to an embodiment.

A layout showing the industrial furnace 101 equipped with the rotary apparatus 100 instead of fired heating is shown on FIG. 4B. FIG. 4B schematically illustrates an arrangement comprising at least one reactor or furnace 101 configured to perform a process or processes related to oil refining and/or petrochemical industries at temperatures essentially equal to or exceeding about 500 degrees Celsius (° C.) and at least one rotary apparatus 100 configured to generate a heated fluidic medium for inputting thermal energy into said at least one reactor or furnace.

In the layout of FIG. 4B, the at least one rotary apparatus 100 is used to replace, fully or partly, the fuel-fired radiant heater burners. In this embodiment, the rotary apparatus 100 is used to heat an inert gas, such steam, air or nitrogen, to the temperatures up to 1700° C. Gas heated in the apparatus 100 is fed into a refractory space of the furnace 101, similarly to fuel in fired heaters. Hot gas from the rotary apparatus would provide heating for the tubes (designated as "heating coils" on FIG. 4B) inside the furnace. The inert gas heated by the apparatus 100 acts hereby as a heating medium/a heat transfer medium for fluid propagated through the tubes/coils inside the furnace 101. In some instances, support burners can remain in the system for boosting (increasing) the temperature of recycle gas and/or for start-up or for balancing variations in electric supply.

In configuration of FIG. 4B, the flue gas exiting from the furnace is further used as an input flow to the rotary apparatus for re-heating (see a Flue gas recycle line, FIG. 4B).

Figure 5A:
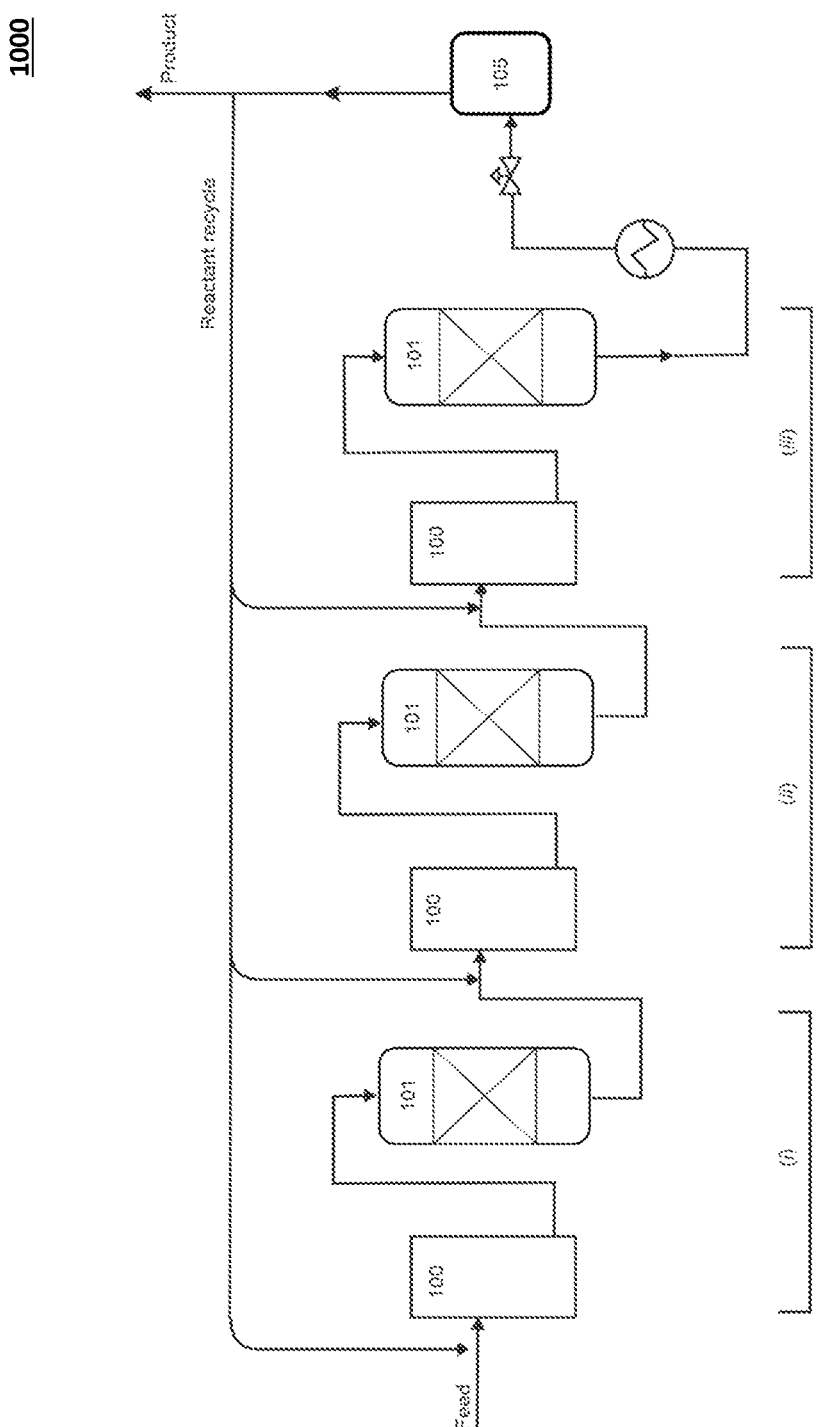
FIGS. 5A and 5B schematically illustrate integration of the rotary apparatus 100 or a number of rotary apparatuses into a facility 1000 configured to implement a heat-consuming process 101 or a number of heat-consuming processes 101.
Figure 5B:
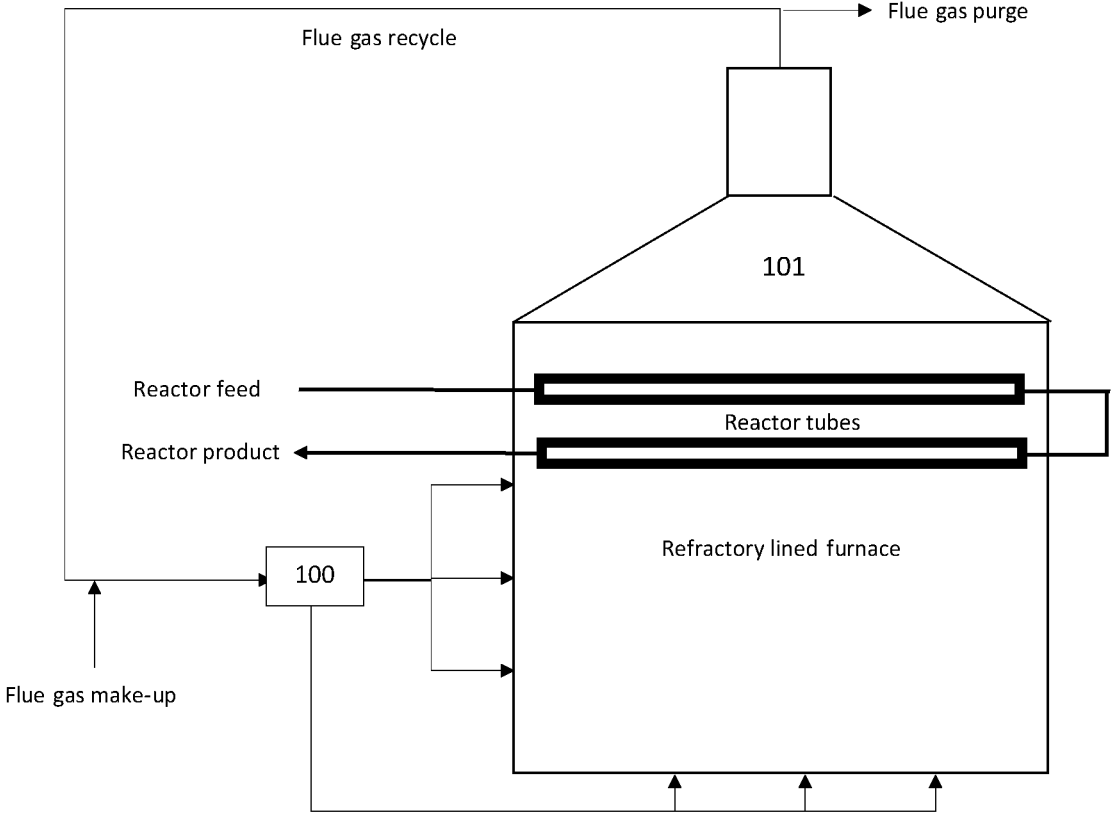

Layout visualized by FIG. 5B is similar to that shown on FIG. 4B, with a difference that the industrial furnace 101 is configured to perform thermal or thermochemical reactions, such as cracking of hydrocarbon feedstocks to produces olefins. FIG. 5B schematically illustrates an arrangement comprising at least one furnace 101 configured to perform a process or processes related to oil refining and/or petrochemical industries at temperatures essentially equal to or exceeding about 500 degrees Celsius (° C.) and at least one rotary apparatus 100 configured to generate a heated fluidic medium for inputting thermal energy into said at least one furnace. The rotary apparatus 100 acts as an indirect heater to heat an inert gas, such steam, air or nitrogen, which is fed into space of the furnace 101 thus providing thermal energy to inside the furnace. In majority of cases reactions are endothermic. The process fluid propagated through the reactor tubes and indirectly heated with the inert heat transfer medium generated by the apparatus 100 can be gas (e.g. hydrocarbon-containing gas), liquid, gas-liquid mixture or gas-vapour/gas-steam mixture.

In configurations of FIGS. 4B and 5B, the existing industrial furnace 101 can be retrofitted with the rotary apparatus 100.

Also, in configuration of FIG. 5B, flue gases (e.g. $N_2$, $CO_2$, $H_2O$, $NO_x$, $SO_x$, particulate matter) exiting from the furnace may be further used as an input flow to the rotary apparatus for reheating (see a Flue gas recycle line, FIG. 5B).

In the indirect heating arrangement (FIGS. 4B, 5B), recycling of heat transfer medium can be implemented in a manner depicted on FIG. 2D, for example. Heat transfer medium cooled in the furnace/reactor unit 101 as a result of heat transfer between said heat transfer medium and the process fluid (hydrocarbon-containing feedstock gas), can be sent for reheating (as stream 9 shown on FIG. 2D). In such a way, heat losses can be minimized. A fraction of unreacted feedstock gas can be recycled, accordingly.

Additional advantage of the rotary apparatus 100 integrated as shown on FIGS. 4B and 5B is that it acts as a blower, providing necessary pressure increase for the fluid to circulate. Hence, the layout eliminates the need for a separate air blower (as in conventional fired furnaces).

Using the rotary apparatus as a recirculating heater allows for optimal heat recovery from the flue gas and for optimal temperature control and management, and additionally ensures that heat losses are minimized. In this configuration, formation of harmful environmental emissions, such as carbon dioxide, nitrogen oxides, sulphur oxides and particulate matter, and their further release into the atmosphere can be avoided or at least minimized.

Circulating the inert gas, such as for example steam or nitrogen, in the rotary apparatus 100 is advantageous particularly in case the fluid to be heated is at high pressure and/or it is flammable. This would provide inert atmosphere in the furnace to improve process safety.

Figure 4C:
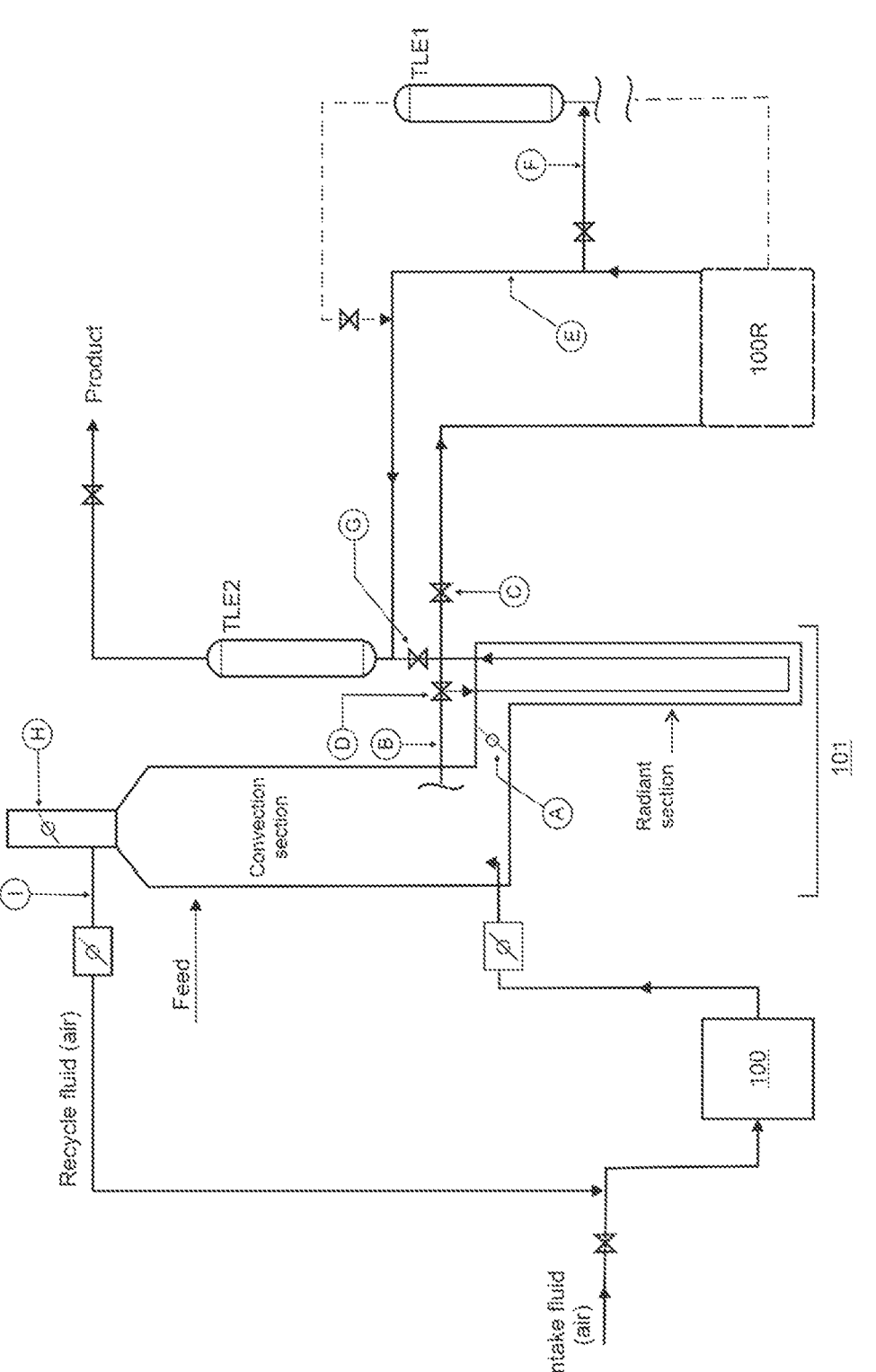
FIG. 4C is a schematic representation of an olefin production facility, according to an embodiment.

FIG. 4C is a schematic representation of a refining and petrochemical facility 1000. In an embodiment, the facility 1000 is configured for thermal or thermochemical pyrolysis of hydrocarbons. In embodiment, the facility 1000 is configured for steam cracking of common hydrocarbon feeds, like ethane, LPG or naphtha to produce light olefins, such as ethylene and propylene.

The facility may comprise a conventional fuel-fired cracking furnace. Conventional cracking furnace comprises a convection section, where the hydrocarbon feed is preheated, vaporized, mixed with a dilution steam and superheated to a temperature level slightly below the temperature (s) at which cracking reactions occur, and a radiant section or reactor section, where hydrocarbon feed undergoes pyrolysis reactions while flowing through reactor tubes (coils). Typical cracking reactions occur at temperatures exceeding about 750-850° C. In conventional fuel-fired cracking furnaces, only up to about 50% of heat produced by burning of fuel is absorbed in the radiant section. The remaining half may be recovered in the convection section.

In one of the embodiments, the cracking furnace 101 (FIG. 4C) is modified such as to form an arrangement with at least one rotary apparatus 100 configured to provide heat input for the hydrocarbon feed in the convection section. The apparatus 100 is hence configured to provide thermal energy for operations related to preheat, vaporization and superheating the hydrocarbon feed in convection tube banks. The apparatus 100 is further configured to extract thermal energy from recycled outlet gases (e.g. flue gases or inert gases/air, depending on operating mode, as described below).

Flexible system design allows integrating the rotary apparatus 100 as a retrofit to existing steam cracker furnaces to maintain all heating functions typically performed by a convection section. This includes for example heating boiler water, superheating steam, vaporization of hydrocarbon feed, superheating dilution steam and superheating hydrocarbon/dilution steam mixture.

The layout of FIG. 4C may optionally be combined with configuration described with regard to FIG. 4B, where the at least one rotary apparatus 100 is used to replace the fuel-fired burners in the radiant section (not shown). Hot gas from the rotary apparatus 100 would heat the reactor tube coils in the radiant section thus providing thermal energy for reactions. In such an event, the fluid to be heated (reacting fluid) can be any one of gas, liquid or gas-liquid mixture. In such configuration, the at least one apparatus 100 can be connected to the radiant section to provide supplementary heat or all heat needed for the process (partial or full replacement of fuel-fired burners in the radiant sections). Retrofit to existing furnaces can be implemented. The rotary apparatus 100 may be configured with a number of duct burners to provide heat to fluids (gas) flowing to the convention section and/or radiant section of the furnace 101.

In some embodiment, the facility shown on FIG. 4C further comprises at least one rotary apparatus 100 adapted to act in a rotary reactor mode and hence referred to as a rotary reactor 100R. The reactor 100R replaces the fuel-fired radiant section (pyrolysis reactor) in the furnace 101/facility 1000. The reactor 100R may be constructed in line with the guidance provided in for example the U.S. Pat. No. 7,232,937 (Bushuev), -U.S. Pat. No. 9,494,038 (Bushuev), -U.S. Pat. No. 9,234,140 (Seppälä et al), and -U.S. Pat. No. 10,744,480 (Rosic & Xu). In configuration combining the at least one rotary apparatus 100 acting as a heater/feed pre-conditioner with the at least one rotary apparatus 100R configured as a reactor for running pyrolysis reactions wherein hydrocarbon-containing feed undergoes cracking inside the reactor 100R, a resulting installation may replace a conventional steam cracking furnace.

Following example provides a more detailed insight on upgrading the furnace 101 with the rotary apparatus technology. The furnace 101 to be upgraded may be any low-capacity furnace, optionally of a so called "swing furnace" type (capable of intaking both liquid- and gas feeds). However, the furnace 101 may be any type of furnace conventionally used in steam cracking. It is preferred that any one of the rotary devices 100, 100R or both, are at least partially electrified (i.e. use electrical energy as input energy). It is further preferred that any one of the rotary devices 100, 100R or both are configured to support an electrically powered mode and a fuel-powered mode and to switch between these modes where the other type of energy is fully or partly unavailable. In addition to renewable electricity (for the electrically powered mode), also a fuel gas (for the fuel-powered mode) can be renewable (e.g. biogas, hydrogen, etc.).

In terms of general functionality, the furnace 101 upgraded by having the rotary devices 100, 100R connected thereto is thus configured to operate in a so-called "rotary reactor-mediated" operating mode and a "fuel-fired" operating mode, and to switch between these modes. The rotary reactor-mediated mode employs a combination of the rotary heater 100 and the rotary reactor 100R and has a fuel-fired radiant section of the furnace switched off (i.e. temporarily set into a non-operating mode). In this configuration, the furnace can be fully electrified and hence emission-free. On the other hand, the fuel-fired operating mode employs a combination of the rotary heater 100 and the furnace's radiant section for pyrolysis reactions. Partial electrification is enabled.

To implement a solution comprising the rotary devices 100, 100R, the cracking furnace 101 and the facility 1000 is/are modified to incorporate the following features (see FIG. 4C).

A furnace bridge wall (section that separates the radiant and convection sections) comprises a partition "A" configured as a damper or a sliding plate, for example, for a bridge wall opening. When the furnace 101 operates with a conventional fuel-fired radiant section, the partition "A" is in open position, which enables fluidic communication between convection and radiant section. When reactor 100R is used to replace the radiant section, the bridge wall opening is closed. In a latter case, fluidic communication between the convection section and the reactor 100R is realized via a valved connection line "C" arranged on a crossover line "B" (a pipe between the convection section outlet and radiant section inlet). The crossover line "B" may be further equipped with a separate valve "D" configured to regulate fluidic flow to the radiant section.

The layout of FIG. 4C comprises a number of heat exchanger devices configured as transfer line exchangers (TLEs). TLEs are common quenching devices in steam cracking furnaces. TLEs cool the cracked effluent against boiler feed water and recover heat in the form of high-pressure steam. Modern cracking furnaces comprise for example two TLEs arranged in series, where the effluent is first instantaneously cooled in a primary TLE (TLE1) to 550-650° C. (outlet t) to prevent degradation of the cracked product followed with further cooling, in a secondary TLE (TLE2) to about 300-450° C. (outlet t) to improve heat recovery. Both exchangers are typically connected to the same steam drum (not shown on FIG. 4C).

The reactor 100R is hence provided with a valved connection to the TLE unit ("E" and "F"). Line "E" connects the reactor 100R to an existing (in the facility 1000) TLE unit designated as TLE2. In such configuration, the "TLE2" unit is provided as the only transfer line exchanger in the facility layout. Alternatively, the reactor 100R may be coupled (line "F") to its own TLE device (i.e. not internal to/existing in the furnace 101/facility 1000). In such configuration, a transfer line exchanger coupled to the reactor 100R through the line "F" acts as a primary TLE (TLE1, FIG. 4C), while the existing transfer line exchanger (line "E") acts as a secondary TLE (TLE2). TLE1 may be temporarily switched off (see valves arranged on the connection line "F" and a line exiting the TLE1) and fluids may be directed into the existing TLE unit via the line "E".

Element "G" designates a valve provided on a line that connects the furnace's radiant section to the existing TLE device ("TLE2"), whether the latter is used as a secondary TLE or as the only TLE. Valve "G" enables fluidic flow from the radiant section to TLE when the reactor 100R is not used. When the reactor 100R is used for cracking reactions, valve "G" is closed.

In some configurations, any one of the TLE units can be used to generate high-pressure steam or to heat or superheat process streams.

A flue gas stack may further be provided with an additional damper "H" to enable recycling of gases for heat recovery. Having the damper "H" closed, the flue gases are not vented into the atmosphere, but instead, recirculated within the facility. In particular, hot flue gases may be utilized for heating fluids in the rotary apparatus 100 (see connection line "I").

Modifications described above provide flexibility in switching between operation of the cracking furnace 101 in a "fuel-fired" operating mode and a "rotary reactor 100R-mediated" operating mode. This allows for performing maintenance operations in the furnace 101/facility 1000, without shutting down the entire facility. Hydrocarbon flow can be flexibly re-routed between separate blocks and furnace sections provided that isolation/separation valving and blinding is properly designed to meet safety requirements.

It is further emphasized that when the furnace operates in the rotary reactor-mediated operating mode, the furnace's convection section is heated with inert gases, such as for example hot air. Hot air is produced in the rotary apparatus 100. Since no wet flue gases is formed in this case, the air flow exiting convection section could be recycled through a suction line "I". An existing induced draft fan can be used to promote the recycle air flow.

Having the furnace 101 operating in the rotary reactor-mediated operating mode allows for minimizing or completely eliminating flue gas emissions into the atmosphere. The latter option is enabled when the rotary devices 100, 100R are electrically powered and the input electrical energy is produced from a renewable source.

Moreover, having the furnace 101 operating in the rotary reactor-mediated operating mode allows for bringing the thermal efficiency of the furnace to nearly 100%. In conventional furnaces, the temperature of flue gas exiting the furnace should not be lower than 120-130° C. due to the risk of water condensation in the flue gas. This limits thermal efficiency of conventional furnaces to 91-94% as calculated from a Lower Heating Value (LHV) of a fuel gas. Using a Higher Heating Value (HHV) in similar calculations for conventional furnaces would result in lower efficiency. Present invention allows for increasing thermal efficiency of the furnace by at least 5-6% as a result of air recycle when the furnace is used in the rotary reactor-mediated operating mode. Recycling air or other hot gas (also flue gases) exiting the convection section by directing it for (pre)heating of fluids entering the apparatus 100 allows for improving the furnace's thermal efficiency and additionally for reducing the power consumption of the rotary apparatus 100. Energy efficiency of the entire facility 1000 can thus be improved and greenhouse gas and particle emissions reduced, accordingly.

Figure 2E:
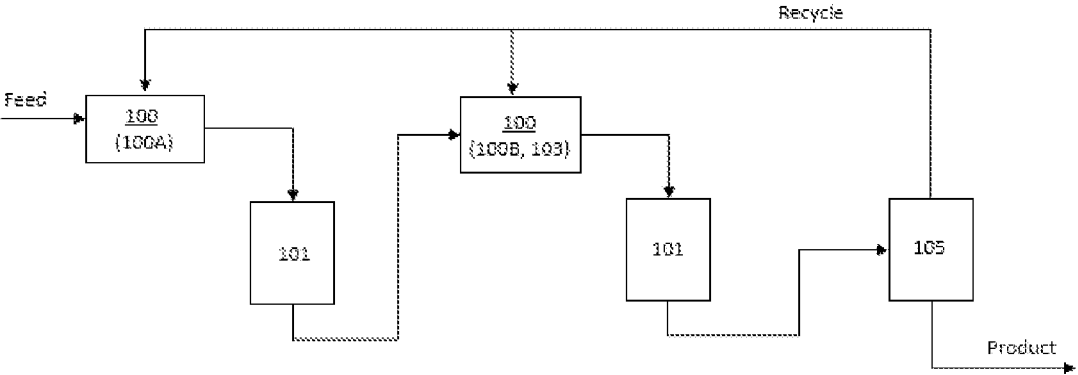

Reference is made back to FIGS. 5A and 5B which can further be viewed as providing an overview of integrating rotary apparatus(es) 100 into a facility 1000 layout comprising a reactor or a number of reactors adapted for endothermic reactions. Much of the chemical industry's emissions come from fuel-fired heaters and furnaces providing heat for high-temperature endothermic catalytic reactions. In addition to steam cracking, many other key base chemical formation reactions are endothermic, such as propane and butane dehydrogenation, gasoline reforming and methane steam reforming. Typically, these reactions require a catalyst to achieve reaction rate and selectivity required by industrial application. The rotary apparatus 100 can be used to provide thermal energy for such catalytic reactions by heating the feed of the catalytic reactors 101 and introducing hot feed to catalytic beds with ascending temperature profile. To maintain reaction rate and to bring the reactions into completion, the rotary apparatus can act as a reheater between said catalytic beds (rf. FIGS. 2E, 5A).

Overall. FIG. 5A provides a more detailed view on a configuration shown on FIG. 2E. FIG. 5A illustrates facility configuration where a number of rotary apparatuses 100 alternate with reactors 101. Each pair of 100-101 is designated with a roman numeral i-iii. Reactors 101 may be configured as gas phase reactors 101 adapted to performed thermal- or catalytic processes related to conversion of hydrocarbons for example. Rotary apparatuses 100 are used as direct heaters of gaseous feed and other reactants. Gaseous feed is thus heated to a maximum allowed temperature (often set by catalyst temperature tolerance and rate of undesired side reactions) and fed into a first catalytic reactor 101 according to FIG. 5A. Reactants are thus heated before they enter the reactor 101. In 101, the reaction is allowed to take place with consequent adiabatic temperature decrease, thereafter the outflow is reheated in the next rotary apparatus 100 to be fed into the next reactor 101 in case desired conversion is not achieved.

FIGS. 5A and 5B illustrate integration of the rotary apparatus 100 into the most common routes of supplying the heat of reaction into endothermic, solid-catalysed reaction processes as follows: 1) to expose catalyst-containing tubes to external heating, for continuously introducing heat through reactor tube to catalyst bed and reactants along the length of the catalyst bed (FIG. 5B, indirect heating); and 2) to heat the reactants to a high temperature before they enter the reactor, allow reaction to take place with consequent adiabatic temperature decrease and then reheat the reactants for next reactor in case desired conversion is not achieved (FIG. 5A, direct heating). While the concept of FIG. 5B is particularly suitable for retrofitting existing furnaces, the concept of FIG. 5A, which involves sending fluid/gas heated in the rotary apparatus directly to heat-consuming process (es), may be beneficial for new, so-called "greenfield" installations. Still, the layout of FIG. 5A can be integrated into existing processes, such as for example into a catalytic gasoline reforming process typically performed in a semi-regenerative catalytic reformer unit in a petroleum refinery. The rotary apparatus 100 can be installed directly into the process by replacing fuel-fired heaters, as described elsewhere in the present disclosure.

It is clear to a person skilled in the art that with the advancement of technology the basic ideas of the present invention may be implemented and combined in various ways. The invention and its embodiments are thus not limited to the examples described herein above, instead they may generally vary within the scope of the appended claims.

The invention claimed is:

1. A method for inputting thermal energy into a process or processes related to oil refining and/or petrochemical industries in a refining and/or petrochemical facility, the method comprises generation of a heated fluidic medium by at least one rotary apparatus integrated into the refining and/or petrochemical facility, the at least one rotary apparatus comprising:

a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, the method further comprises:

integrating the at least one rotary apparatus into the refining and/or petrochemical facility configured to carry out heat-consuming process or processes related to refining of oil and/or producing petrochemicals at temperatures essentially equal to or exceeding about 500 degrees Celsius (° C.), conducting an amount of input energy into the at least one rotary apparatus integrated into the refining and/or petrochemical facility, the input energy comprises electrical energy, operating the at least one rotary apparatus integrated into the refining and/or petrochemical facility such, that an amount of thermal energy in imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated, and generating a heated medium outside the rotary apparatus through a process of heat transfer between the stream of heated fluidic medium generated in the rotary apparatus and a process stream bypassing the rotary apparatus.

2. The method of claim 1, comprising connecting, in said refining and/or petrochemical facility, the at least one rotary apparatus to at least one heat-consuming unit configured as a reactor or furnace and adapted to carry out heat-consuming process or processes related to refining of oil and/or producing petrochemicals in the refining and/or petrochemical facility.

3. The method of claim 2, wherein the at least one heat-consuming unit is further configured as any one of: a heater, a burner, an incinerator, a boiler, a dryer, a conveyor device, or a combination thereof.

4. The method of claim 1, comprising generation of the fluidic medium heated to the temperature essentially equal to or exceeding about 500 degrees Celsius (° C.).

5. The method of claim 1, comprising adjusting velocity and/or pressure of the stream of fluidic medium propagating through the rotary apparatus, to produce conditions, at which the stream of the heated fluidic medium is generated.

6. The method of claim 1, in which the heated fluidic medium is generated by at least one rotary apparatus comprising two or more rows of rotor blades sequentially arranged along the rotor shaft.

7. The method of claim 1, in which the heated fluidic medium is generated by at least one rotary apparatus further comprising a diffuser area arranged downstream of the at least one row of rotor blades, the method comprises operating the at least one rotary apparatus integrated into the refining and/or petrochemical facility such, that an amount of thermal energy is imparted to a stream of fluidic medium directed along a flow path formed inside the casing between the inlet and the exit by virtue of a series of energy transformations occurring when said stream of fluidic medium successively passes through the stationary vanes, the rotor blades and the diffuser area, respectively, whereby a stream of heated fluidic medium is generated.

8. The method of claim 7, wherein, in said rotary apparatus, the diffuser area is configured with or without stationary diffuser vanes.

9. The method of claim 1, in which the amount of thermal energy added to the stream of fluidic medium propagating through the rotary apparatus is controlled by adjusting the amount of input energy conducted into the at least one rotary apparatus integrated into the refining and/or petrochemical facility.

10. The method of claim 1, further comprising arranging an additional heating apparatus downstream the at least one rotary apparatus and introducing a reactive compound or a mixture of reactive compounds to the stream of fluidic medium propagating through said additional heating apparatus, whereupon the amount of thermal energy is added to said stream of fluidic medium through exothermic reaction(s).

11. The method of claim 10, wherein the reactive compound or a mixture of reactive compounds is introduced to the stream of fluidic medium preheated to a predetermined temperature.

12. The method of claim 11, wherein the reactive compound or a mixture of reactive compounds is introduced to the stream of fluidic medium preheated to a temperature essentially equal to or exceeding about 1700° C.

13. The method of any one of claim 11, wherein preheating of the stream of fluidic medium to the predetermined temperature is implemented in the rotary apparatus.

14. The method of claim 1, comprising generation of the heated fluidic medium by at least two rotary apparatuses integrated into the refining and/or petrochemical facility, wherein the at least two rotary apparatuses are connected in parallel or in series.

15. The method of claim 14, comprising generation of the heated fluidic medium by at least two sequentially connected rotary apparatuses, wherein the stream of fluidic medium is preheated to a predetermined temperature in at least a first rotary apparatus in a sequence, and wherein said stream of fluidic medium is further heated in at least a second rotary apparatus in the sequence by inputting an additional amount of thermal energy into the stream of preheated fluidic medium propagating through said second rotary apparatus.

16. The method of claim 15, wherein, in at least the first rotary apparatus in the sequence, the stream of fluidic medium is preheated to a temperature essentially equal to or exceeding about 1700° C.

17. The method of claim 15, further comprising introducing a reactive compound or a mixture of reactive compounds to the stream of fluidic medium propagating through said at least second rotary apparatus, wherein the additional amount of thermal energy is added to the stream of fluidic medium propagating through said at least second rotary apparatus in the sequence by virtue of introducing the reactive compound or a mixture of compounds into said stream.

18. The method of claim 17, comprising introducing the reactive compound or a mixture of reactive compounds into the heat-consuming process or processes related to refining of oil and/or producing petrochemicals.

19. The method of claim 1, in which the heated fluidic medium generated by the at least one rotary apparatus is selected from the group consisting of a feed gas, a recycle gas, a make-up gas, and a process fluid.

20. The method of claim 1, wherein the fluidic medium that enters the rotary apparatus is an essentially gaseous medium.

21. The method of claim 1, comprising generation of the heated fluidic medium in the rotary apparatus.

22. The method of claim 21, wherein the heated fluidic medium generated in the rotary apparatus is a hydrocarbon-containing gas.

23. The method of claim 21, wherein the heated fluidic medium generated in the rotary apparatus is a gaseous medium other than the hydrocarbon-containing gas.

24. The method of claim 1, further comprising increasing pressure in the stream of fluidic medium propagating through the rotary apparatus.

25. The method of claim 1, in which the amount of electrical energy conducted as the input energy into the at least one rotary apparatus integrated in the refining and/or petrochemical facility is within a range of about 5 percent to 100 percent.

26. The method of claim 1, wherein the amount of electrical energy conducted as the input energy into the at least one rotary apparatus integrated in the refining and/or petrochemical facility is obtainable from a source of renewable energy or a combination of different sources of energy, optionally, renewable energy.

27. The method of claim 1, wherein the at least one rotary apparatus is utilized to balance variations in the amount of electrical energy, optionally renewable electrical energy, by virtue of being integrated into the refining and/or petrochemical facility together with an at least one non-electrical energy operable heater device.

28. A method for oil refining and/or production of petrochemicals, the method comprising generation of a heated fluidic medium by at least one rotary apparatus integrated into a refining and petrochemical facility, the at least one rotary apparatus comprising:

a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, wherein an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated, the method further comprising:

conducting an amount of input energy into the at least one rotary apparatus integrated into the refining and/or petrochemical facility, the input energy comprising electrical energy, generating a heated medium outside the at least one rotary apparatus through a process of heat transfer between the stream of heated fluidic medium generated by the at least one rotary apparatus and a process stream bypassing the rotary apparatus, supplying the stream of heated fluidic medium generated by the at least one rotary apparatus into the refining and petrochemical facility, and operating said at least one rotary apparatus and said refining and petrochemical facility to carry out a process or processes related to oil refining and/or production of petrochemicals at temperatures essentially equal to or exceeding about 500 degrees Celsius (°C.).

29. The method of claim 4, comprising generation of the fluidic medium heated to the temperature equal to or exceeding about 1200° C.

30. The method of claim 29, comprising generation of the fluidic medium heated to the temperature equal to or exceeding about 1700° C.

31. The method of claim 23, wherein the heated fluidic medium generated in the rotary apparatus is a gaseous medium selected from the group consisting of: air, steam ($H_2O$), nitrogen ($N_2$), hydrogen ($H_2$), carbon dioxide ($CO_2$), carbon monoxide (CO), ammonia ($NH_3$), or any combination thereof.

* * * * *